US012565913B2

(12) United States Patent
Hagiwara

(10) Patent No.: US 12,565,913 B2
(45) Date of Patent: Mar. 3, 2026

(54) ROLLER BEARING FOR SUPPORTING WHEEL

(71) Applicant: NSK Ltd., Tokyo (JP)

(72) Inventor: Nobuyuki Hagiwara, Takasaki (JP)

( * ) Notice: Subject to any disclaimer, the term of this patent is extended or adjusted under 35 U.S.C. 154(b) by 90 days.

(21) Appl. No.: 18/708,599

(22) PCT Filed: Nov. 10, 2022

(86) PCT No.: PCT/JP2022/041986
§ 371 (c)(1),
(2) Date: May 9, 2024

(87) PCT Pub. No.: WO2023/085381
PCT Pub. Date: May 19, 2023

(65) Prior Publication Data
US 2025/0012326 A1 Jan. 9, 2025

(30) Foreign Application Priority Data

Nov. 11, 2021 (JP) ................................. 2021-183819

(51) Int. Cl.
F16C 19/48 (2006.01)
B60B 27/00 (2006.01)
(Continued)

(52) U.S. Cl.
CPC .......... F16C 19/381 (2013.01); F16C 19/545 (2013.01); F16C 33/581 (2013.01); F16C 19/48 (2013.01); F16C 2326/02 (2013.01)

(58) Field of Classification Search
CPC ...... F16C 19/381; F16C 19/48; F16C 19/545; F16C 33/581; F16C 2226/80; F16C 2326/02; B60B 27/001; B60B 27/0026
See application file for complete search history.

(56) References Cited

U.S. PATENT DOCUMENTS 4,168,869 A * 9/1979 Stephan ................ F16C 19/545
384/620
2008/0258541 A1 10/2008 Kamikawa et al.
2020/0072281 A1 3/2020 Hagiwara

FOREIGN PATENT DOCUMENTS

DE 102012216235 A1 * 3/2014 ............ F16C 33/588
FR 2369942 A1 * 6/1978
(Continued)

OTHER PUBLICATIONS

International Search Report dated Jan. 31, 2023 for PCT/JP2022/041986.

(Continued)

*Primary Examiner* — Phillip A Johnson
(74) *Attorney, Agent, or Firm* — SHIPWAY IP

(57) ABSTRACT

A wheel support rolling bearing includes an inner ring; an outer ring; and a plurality of needle rollers. The inner ring includes a first raceway surface facing the outer ring in a radial direction, and a second raceway surface and a third raceway surface facing the outer ring in an axial direction. The second raceway surface is located on an inner side in the axial direction with respect to the outer ring, and the third raceway surface is located on an outer side in the axial direction with respect to the outer ring. The plurality of needle rollers include a plurality of first needle rollers disposed between the first raceway surface and the outer ring, a plurality of second needle rollers disposed between the second raceway surface and the outer ring, and a plurality of third needle rollers disposed between the third raceway surface and the outer ring.

14 Claims, 20 Drawing Sheets

(51) Int. Cl.
F16C 19/38 (2006.01)
F16C 19/54 (2006.01)
F16C 33/58 (2006.01)

(56) References Cited

FOREIGN PATENT DOCUMENTS

| | | | | | |
|----|----------------|---------|---------|---|------------|
| GB | 932571 | | 7/1963 | | |
| GB | 932571 A | * | 7/1963 | ............ | F16C 19/381 |
| JP | S56-042719 | | 4/1981 | | |
| JP | 2007-261490 | | 10/2007 | | |
| JP | 2009-154591 | | 7/2009 | | |
| JP | 2019-206978 | | 12/2019 | | |
| WO | WO-2015018838 A1 | * | 2/2015 | ........... | F16H 57/043 |
| WO | 2019/026358 | | 2/2019 | | |

OTHER PUBLICATIONS

International Preliminary Report on Patentability with Written Opinion dated May 23, 2024 for PCT/JP2022/041986.

* cited by examiner

ROLLER BEARING FOR SUPPORTING WHEEL

CROSS-REFERENCE TO RELATED APPLICATIONS

This application is a 35 U.S.C. § 371 national phase application of PCT/JP2022/041986, filed on Nov. 10, 2022, which claims priority to Japanese Patent Application No. 2021-183819, filed on Nov. 11, 2021.

TECHNICAL FIELD

One aspect of the present disclosure relates to a wheel support rolling bearing.

BACKGROUND ART

For example, Patent Literatures 1 and 2 describe wheel support rolling bearings used in an automobile to rotatably support a wheel with respect to a vehicle body. In these wheel support rolling bearings, balls or tapered rollers are used as rolling elements.

CITATION LIST

Patent Literature

Patent Literature 1: Japanese Unexamined Patent Publication No. 2009-154591
Patent Literature 2: Japanese Unexamined Patent Publication No. 2007-261490

SUMMARY OF INVENTION

Technical Problem

In the wheel support rolling bearings as described above, the space for disposing the rolling elements is large, and downsizing is difficult to achieve. For that reason, there are problems such as there being a limit to weight reduction and the wheel support rolling bearing being difficult to install in a narrow space.

Therefore, an object of one aspect of the present disclosure is to provide a wheel support rolling bearing that can be downsized.

Solution to Problem

A wheel support rolling bearing according to one aspect of the present disclosure is a wheel support rolling bearing used to rotatably support a wheel with respect to a vehicle body, the bearing including: an inner ring to be fixed to the wheel; an outer ring to be fixed to the vehicle body; and a plurality of needle rollers rollably disposed between the inner ring and the outer ring. The inner ring includes a first raceway surface facing the outer ring in a radial direction, and a second raceway surface and a third raceway surface facing the outer ring in an axial direction, the second raceway surface is located on an inner side in the axial direction with respect to the outer ring, and the third raceway surface is located on an outer side in the axial direction with respect to the outer ring. The plurality of needle rollers include a plurality of first needle rollers disposed between the first raceway surface and the outer ring, a plurality of second needle rollers disposed between the second raceway surface and the outer ring, and a plurality of third needle rollers disposed between the third raceway surface and the outer ring.

In the wheel support rolling bearing, the inner ring includes the first raceway surface facing the outer ring in the radial direction, and the second raceway surface and the third raceway surface facing the outer ring on the inner side and the outer side in the axial direction, respectively. The first needle rollers, the second needle rollers, and the third needle rollers are disposed between the first raceway surface and the outer ring, the second raceway surface and the outer ring, and the third raceway surface and the outer ring, respectively. Accordingly, a radial load can be taken by the first needle rollers, and an axial load can be taken by the second needle rollers and the third needle rollers. In addition, since these rolling elements are formed of needle rollers, the space for disposing the rolling elements can be reduced, and downsizing can be achieved. Therefore, according to the wheel support rolling bearing, downsizing can be achieved.

The inner ring may include a first member including the second raceway surface, and a second member including the third raceway surface. One of the first member and the second member may include a tightening portion. The first member and the second member may be fixed to each other by tightening the tightening portion. In this case, since the inner ring is formed of the first member and the second member that are fixed to each other by tightening, the manufacture of the inner ring can be facilitated. In addition, the first member and the second member can be firmly coupled by being fixed to each other through tightening.

The first member may include the tightening portion, and a tightening part formed by tightening the tightening portion may be exposed to an outside in the axial direction. In this case, the tightening part can be visually recognized from the outside in the axial direction. In this case, there are advantages, for example, it is easy to discover the occurrence of an abnormality in the tightening part, it is easy to identify the timing of replacement of a member, and it is easy to perform maintenance.

The second member may include the tightening portion, and a tightening part formed by tightening the tightening portion may be exposed to an inside in the axial direction. In this case, the design of the wheel support rolling bearing can be facilitated.

A through-hole may be formed in the other of the first member and the second member, and the first member and the second member may be fixed to each other by tightening the tightening portion in a state where the tightening portion is inserted through the through-hole. In this case, the first member and the second member can be fixed to each other in a mechanically hooked state, the occurrence of a creep phenomenon where the first member and the second member rotate relative to each other can be suppressed, and the deformation of the inner ring caused by a frictional force between the first member and the second member can be suppressed.

The tightening portion may be formed of a plurality of parts extending along the axial direction and formed to line up along a circumferential direction. In this case, the first member and the second member can be more firmly fixed to each other. In addition, the tightening portion can be made difficult to crack.

The second raceway surface and an abutting surface of the first member against the second member may be ground surfaces subjected to grinding or lapped surface subjected to lapping. In this case, variations in preload applied to the second needle rollers can be suppressed.

The third raceway surface and an abutting surface of the second member against the first member may be ground surfaces subjected to grinding or lapped surface subjected to lapping. In this case, variations in preload applied to the third needle rollers can be suppressed.

The inner ring may be made of a plate-shaped member. In this case, the degree of freedom in designing the inner ring can be increased, and the inner ring can be downsized and reduced in weight.

The inner ring may include a fixing portion in which an insertion hole through which a fixing member is inserted is formed, and a thickness of the fixing portion may be thicker than thicknesses of parts of the inner ring other than the fixing portion. In this case, the strength of the fixing portion can be increased.

A spline for an engagement with a joint unit of a drive shaft may be formed on the inner ring. In this case, the joint unit of the drive shaft can be engaged with the inner ring.

The inner ring may further include a fourth raceway surface spaced apart from the first raceway surface, the second raceway surface, and the third raceway surface, and the plurality of needle rollers may further include a plurality of fourth needle rollers disposed between the fourth raceway surface and the outer ring. In this case, it is possible to increase the load that can be taken by the bearing, while suppressing an increase in the size of the bearing.

The first member may include a first flange portion formed in an annular plate shape, and facing the outer ring on the inner side in the axial direction, and the first flange portion may include the second raceway surface. The second member may include a second flange portion formed in an annular plate shape, and facing the outer ring on the outer side in the axial direction, and the second flange portion may include the third raceway surface. In this case, the degree of freedom in designing the inner ring can be increased, and the inner ring can be downsized and reduced in weight.

The inner ring may include a first fixing portion fixed to the wheel, and the outer ring may include a second fixing portion fixed to the vehicle body. When a distance between an axially outer surface of the first fixing portion and an axially inner surface of the second fixing portion in the axial direction is L, and a distance between centers of the first needle rollers in the radial direction is D, D/L may be 2 or more. In this case, the diameter of the bearing can be increased.

Advantageous Effects of Invention

According to one aspect of the present disclosure, it is possible to provide the wheel support rolling bearing that can be downsized.

DESCRIPTION OF EMBODIMENTS

Figure 1:
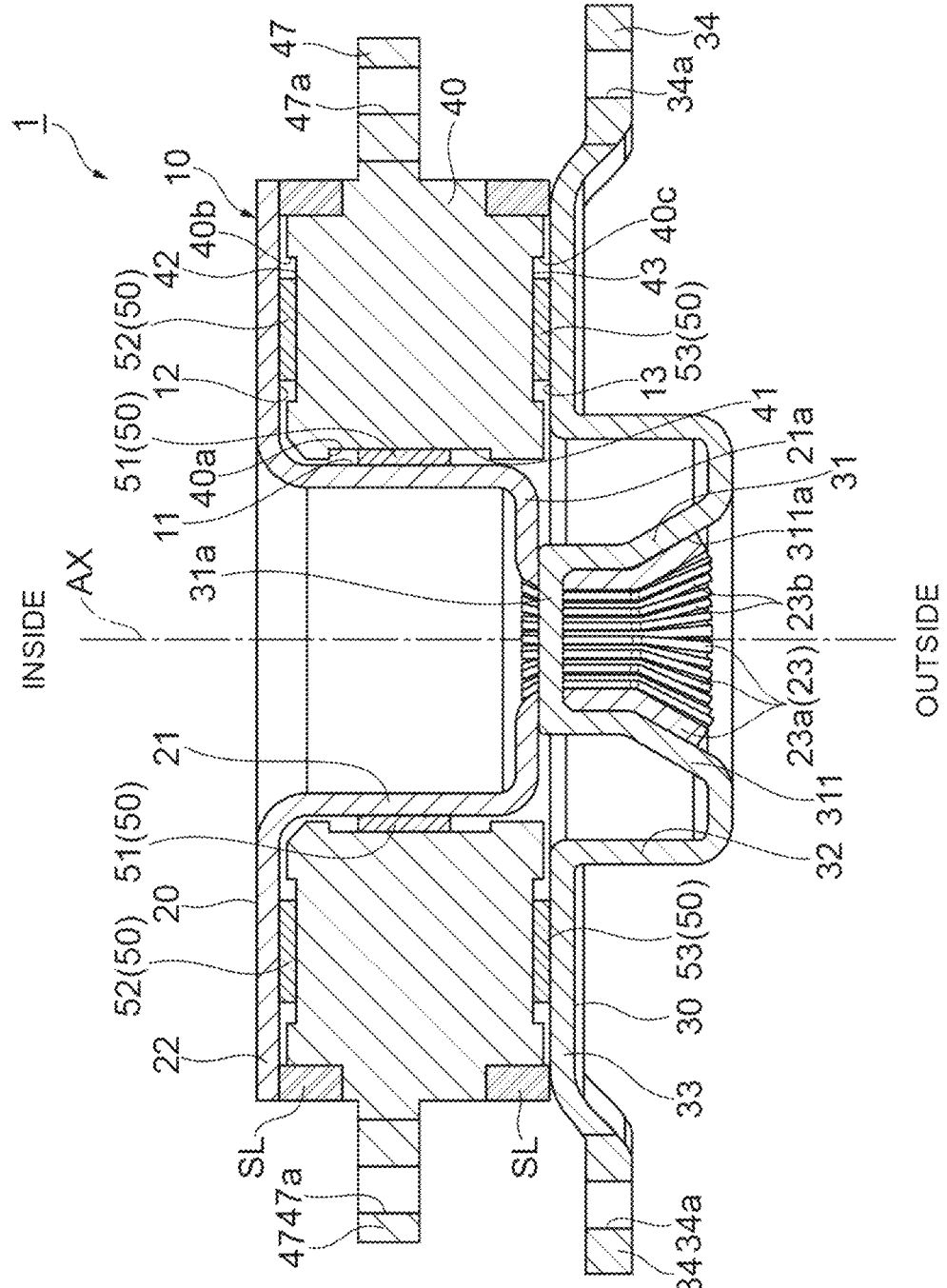
FIG. 1 is a cross-sectional view of a rolling bearing of an embodiment.

Hereinafter, an embodiment of the present invention will be described in detail with reference to the drawings. In the following description, the same reference signs are used for the same or corresponding elements, and duplicate descriptions will be omitted.

As shown in FIGS. 1 to 6, a rolling bearing (a wheel support rolling bearing and a hub bearing) 1 includes an inner ring 10, an outer ring 40, and a plurality of needle rollers 50. For example, the rolling bearing 1 is used in a vehicle such as an automobile to rotatably support a wheel with respect to a vehicle body. The inner ring 10 is fixed to the wheel, and the outer ring 40 is fixed to the vehicle body. The inner ring 10 may be fixed to a drive wheel or may be fixed to a driven wheel. When the inner ring 10 is fixed to the drive wheel, a drive shaft is coupled to the inner ring 10, for example, via a constant velocity joint (joint unit). This example will be described later with reference to FIG. 10. The outer ring 40 is fixed to, for example, a suspension device of the vehicle body.

Hereinafter, a direction parallel to a rotation axis AX of the rolling bearing 1 will be described as an axial direction, a direction around the rotation axis AX will be described as a circumferential direction, and a direction perpendicular to the rotation axis AX will be described as a radial direction. In addition, a side on which the wheel is located with respect to the vehicle body in the axial direction (lower side in FIG. 1) will be described as the outside or outer side, and a side on which the vehicle body is located with respect to the wheel in the axial direction (upper side in FIG. 1) will be described as the inside or inner side. The inner ring 10 includes a first member (main body member) 20 and a second member (flange member) 30. The first member 20 and the second member 30 are made of a plate-shaped metal member. Namely, the first member 20 and the second member 30 are formed by plate forming using a plate material. In this example, the first member 20 and the second member 30 are formed by pressing a plate material.

The first member 20 includes a cylindrical portion 21, a first flange portion 22, and a tightening portion 23. The cylindrical portion 21 is formed in a cylindrical shape having the rotation axis AX as the center line. The cylindrical portion 21 includes a bottom portion 21a on the outer side in the axial direction, which extends perpendicularly to the axial direction. The first flange portion 22 is formed in an annular plate shape, and extends from an axially inner edge of the cylindrical portion 21 to the outside in the radial direction. The first flange portion 22 extends perpendicularly to the axial direction, and faces the outer ring 40 on the inner side in the axial direction.

Figure 4:
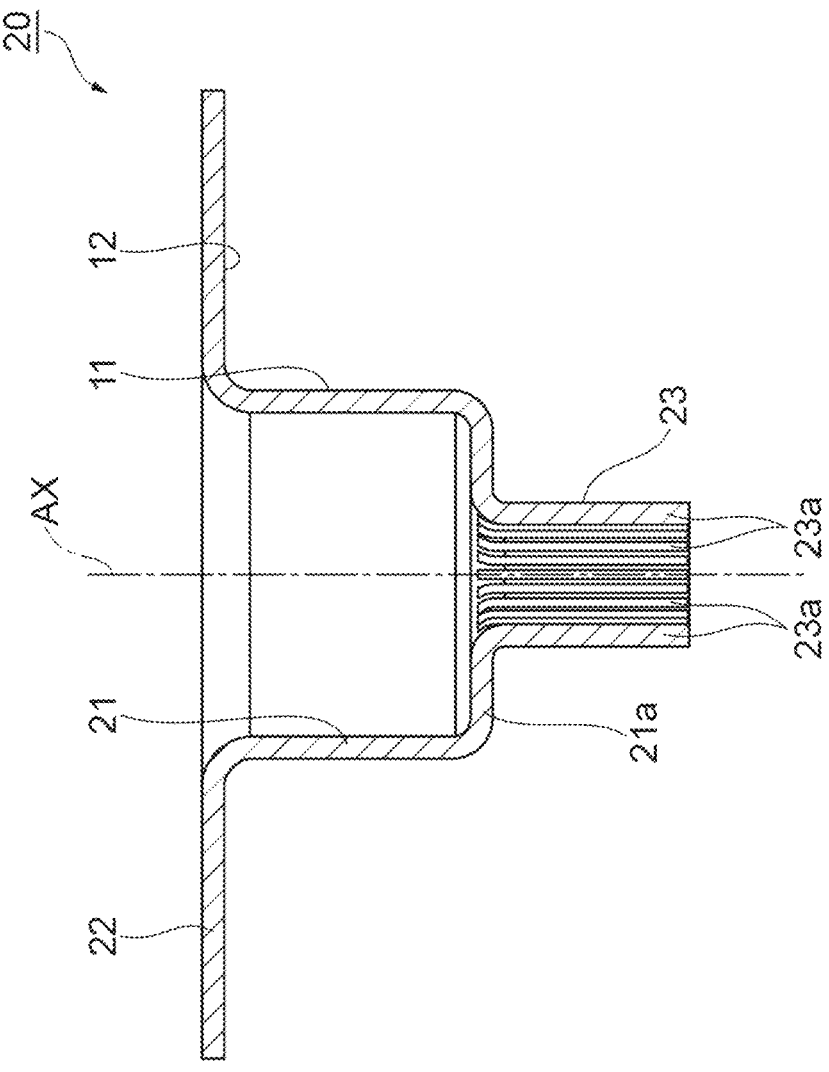
FIG. 4 is a cross-sectional view of a first member of an inner ring.
Figure 5:
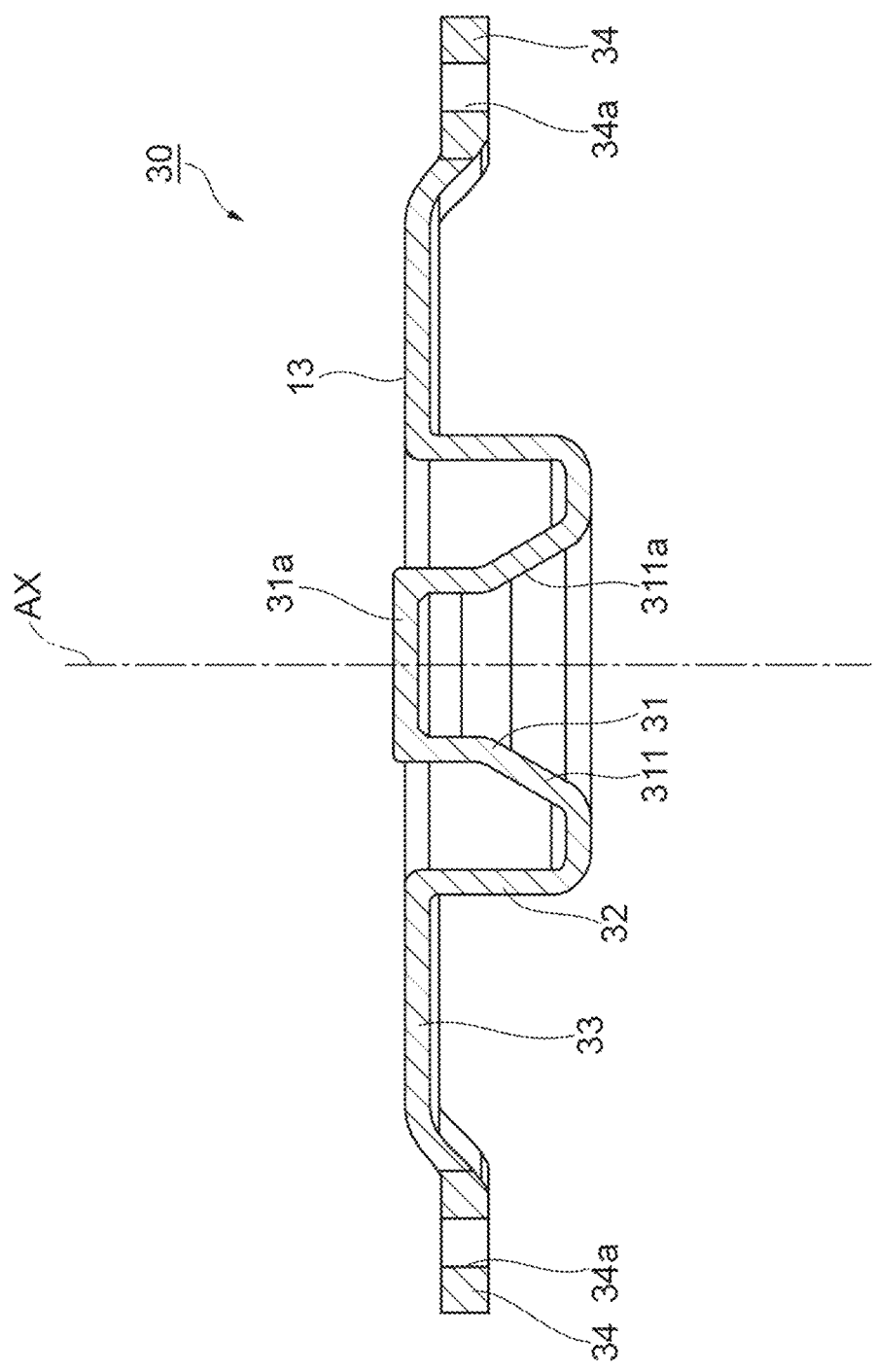
FIG. 5 is a cross-sectional view of a second member of the inner ring.

The tightening portion 23 extends from a central portion of the bottom portion 21a of the cylindrical portion 21 to the outside in the axial direction. In this example, the tightening portion 23 is formed of a plurality of extending parts 23a extending along the axial direction and formed to line up along the circumferential direction. Each extending part 23a is formed, for example, in a long plate shape (rod shape having a rectangular cross section). As will be described later, the tightening portion 23 is tightened when the first member 20 and the second member 30 are fixed to each other. FIG. 1 shows the tightening portion 23 after tightening, and FIG. 4 shows the tightening portion 23 before tightening.

The second member 30 includes a first cylindrical portion 31, a second cylindrical portion 32, a second flange portion 33, and a plurality of (in this example, four) fixing portions (first fixing portions) 34. The first cylindrical portion 31 is formed in a substantially cylindrical shape having the rotation axis AX as the center line. The first cylindrical portion 31 includes a bottom portion 31a on the inner side in the axial direction, which extends perpendicularly to the axial direction. An outer part 311 of the first cylindrical portion 31 in the axial direction is formed in a shape that expands to the outside in the radial direction as the outer part 311 extends to the outside in the axial direction. The outer part 311 has an inner surface 311a that is inclined toward the outside in the radial direction as the inner surface 311a extends toward the outside in the axial direction. The second cylindrical portion 32 is formed in a substantially cylindrical shape having the rotation axis AX as the center line, and is disposed to surround the first cylindrical portion 31. The first cylindrical portion 31 and the second cylindrical portion 32 are connected to each other and integrated on the outer side in the axial direction.

The second flange portion 33 is formed in an annular plate shape, and extends from an axially inner edge of the second cylindrical portion 32 to the outside in the radial direction. The second flange portion 33 extends perpendicularly to the axial direction, and faces the outer ring 40 on the outer side in the axial direction.

The fixing portions 34 extend from an outer peripheral surface of the second flange portion 33 to the outside in the radial direction, and protrude from the second flange portion 33 to the outside in the radial direction. Four fixing portions 34 are disposed in line at equal intervals along the circumferential direction. Insertion holes 34a penetrating through the fixing portions 34 in the axial direction are formed in the fixing portions 34. Fixing members for fixing the inner ring 10 to the wheel are inserted through the insertion holes 34a. The fixing members are, for example, bolts. The inner ring 10 is fixed to the wheel by inserting the fixing members through the insertion holes 34a and fastening the fixing members to the wheel. A thickness of the fixing portions 34 is thicker than thicknesses of parts (in this example, the first cylindrical portion 31, the second cylindrical portion 32, and the second flange portion 33) of the inner ring 10 other than the fixing portions 34. For example, the thickness of the fixing portions 34 can be increased by sandwiching the fixing portions 34 between a pair of molds.

Figure 6:
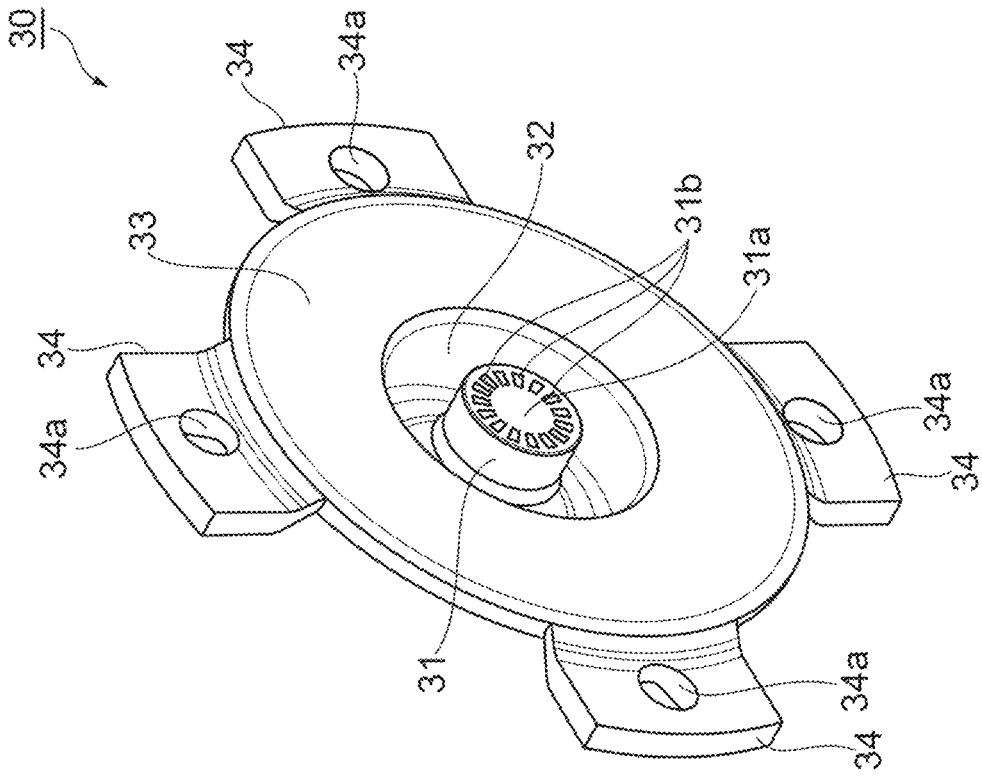
FIG. 6 is a perspective view of the second member.
Figure 7:
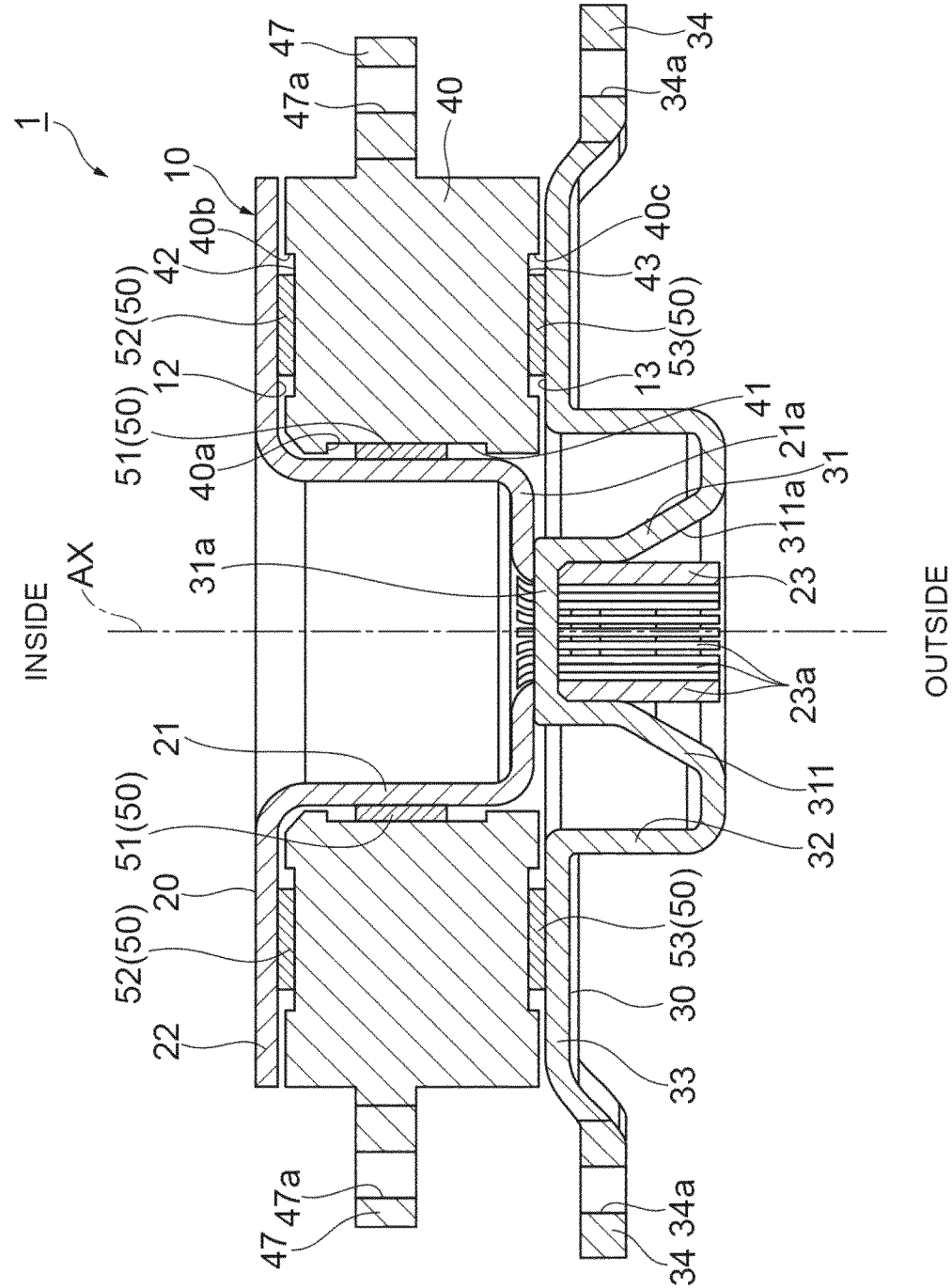
FIG. 7 is a cross-sectional view showing the state of a tightening portion before tightening.

The first member 20 and the second member 30 are fixed to each other by tightening the tightening portion 23 of the first member 20. Hereinafter, this fixation will be further described. A plurality of through-holes 31b penetrating through the bottom portion 31a along the axial direction are formed in the bottom portion 31a of the first cylindrical portion 31 of the second member 30 (FIG. 6). The plurality of through-holes 31b are formed, for example, in the same number as the plurality of extending parts 23a of the tightening portion 23, and are disposed in line at equal intervals along the circumferential direction. The first member 20 and the second member 30 are fixed to each other by tightening each extending part 23a in a state where the plurality of extending parts 23a are inserted through the plurality of respective through-holes 31b. FIG. 7 shows the state before tightening, and FIG. 1 shows the state after tightening.

As shown in FIG. 1, through a tightening process, the extending parts 23a are bent at intermediate portions thereof, and are deformed such that tip side parts of the extending parts 23a are aligned with the inner surface 311a of the outer part 311 of the first cylindrical portion 31. In such a manner, "tightening the tightening portion 23" refers to bending and deforming the tightening portion 23 in order to fix the members, and in this example, the tightening portion 23 is deformed such that the first member 20 and the second member 30 are fixed to each other. In this example, tightening parts 23b (tip side parts of the extending parts 23a) formed by tightening the tightening portion 23 are exposed to the outside in the axial direction. Namely, the tightening parts 23b can be visually recognized when viewed from the outside in the axial direction.

Figure 8:
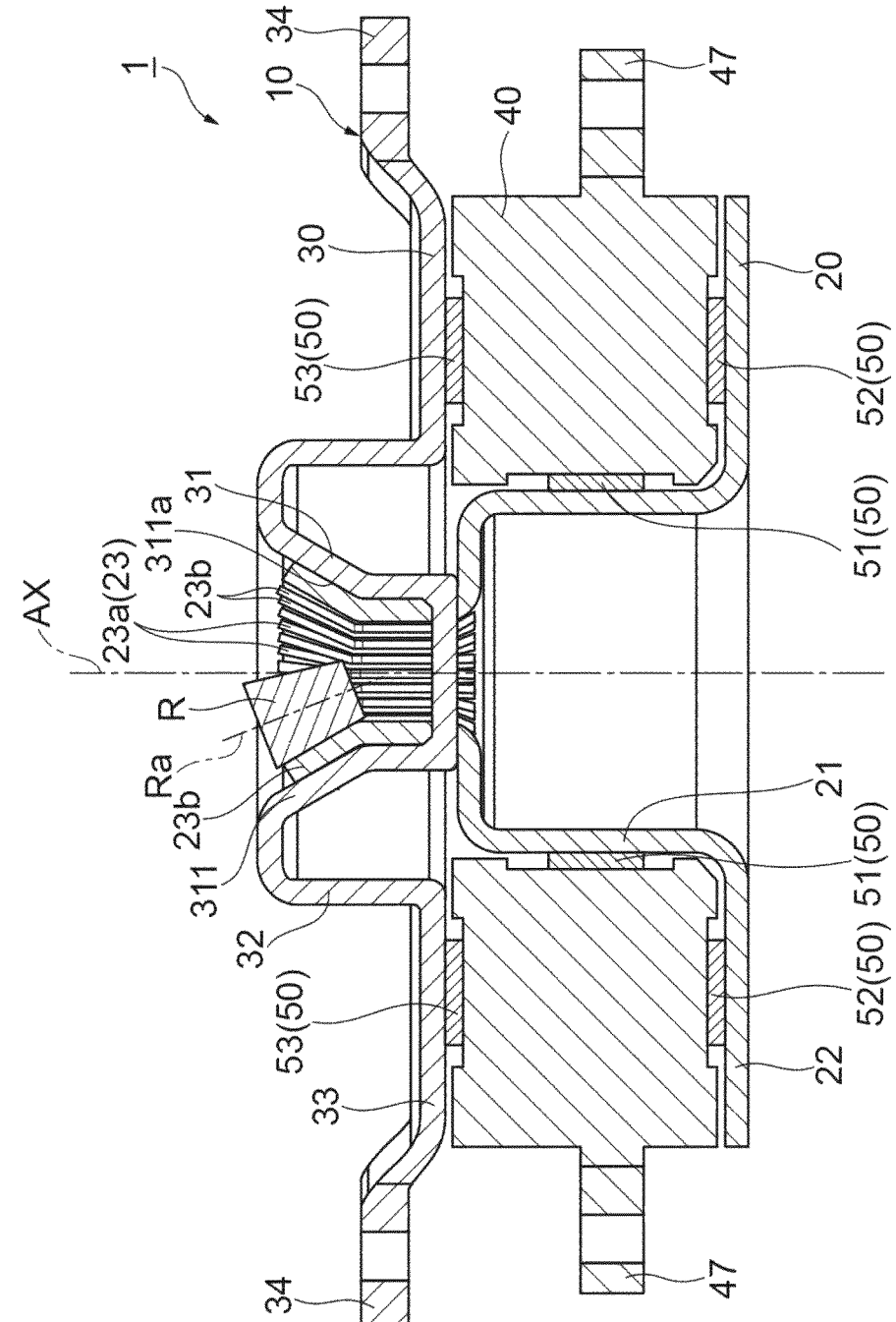
FIG. 8 is a cross-sectional view for describing a tightening process.

As shown in FIG. 8, in the tightening process, the tip side part of the tightening portion 23 is tightened by a roller R. For example, in this example, the tightening portion 23 is tightened by spin-tightening using the roller R of which a center line Ra is inclined with respect to the axial direction.

The outer ring 40 is formed, for example, in a ring shape by a metal material. The outer ring 40 is disposed to surround the cylindrical portion 21 of the first member 20 of the inner ring 10. The outer ring 40 faces the first flange portion 22 of the first member 20 on the inner side in the axial direction, and faces the second flange portion 33 of the second member 30 of the inner ring 10 on the outer side in the axial direction. A plurality of (in this example, four) fixing portions (second fixing portions) 47 for fixing to the vehicle body are formed on an outer peripheral surface of the outer ring 40. The fixing portions 47 extend from the outer peripheral surface of the outer ring 40 to the outside in the radial direction. Insertion holes 47a are formed in the fixing portions 47, and fixing members (for example, bolts) for fixing to the vehicle body are inserted through the insertion holes 47a. The outer ring 40 is formed, for example, by forging and machining, but may be formed by plate forming.

Figure 2:
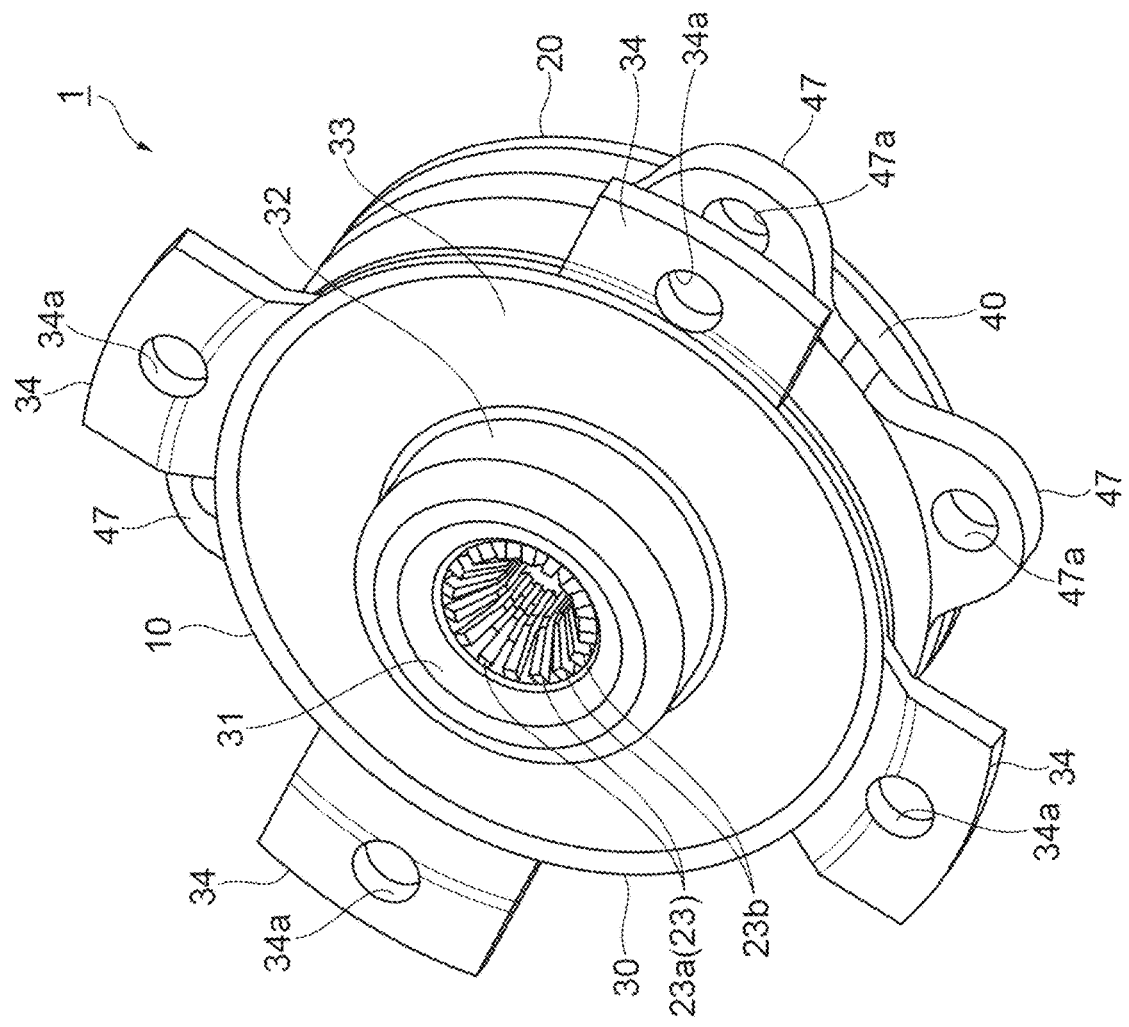
FIG. 2 is a perspective view of the rolling bearing when viewed from the outside in an axial direction.
Figure 3:
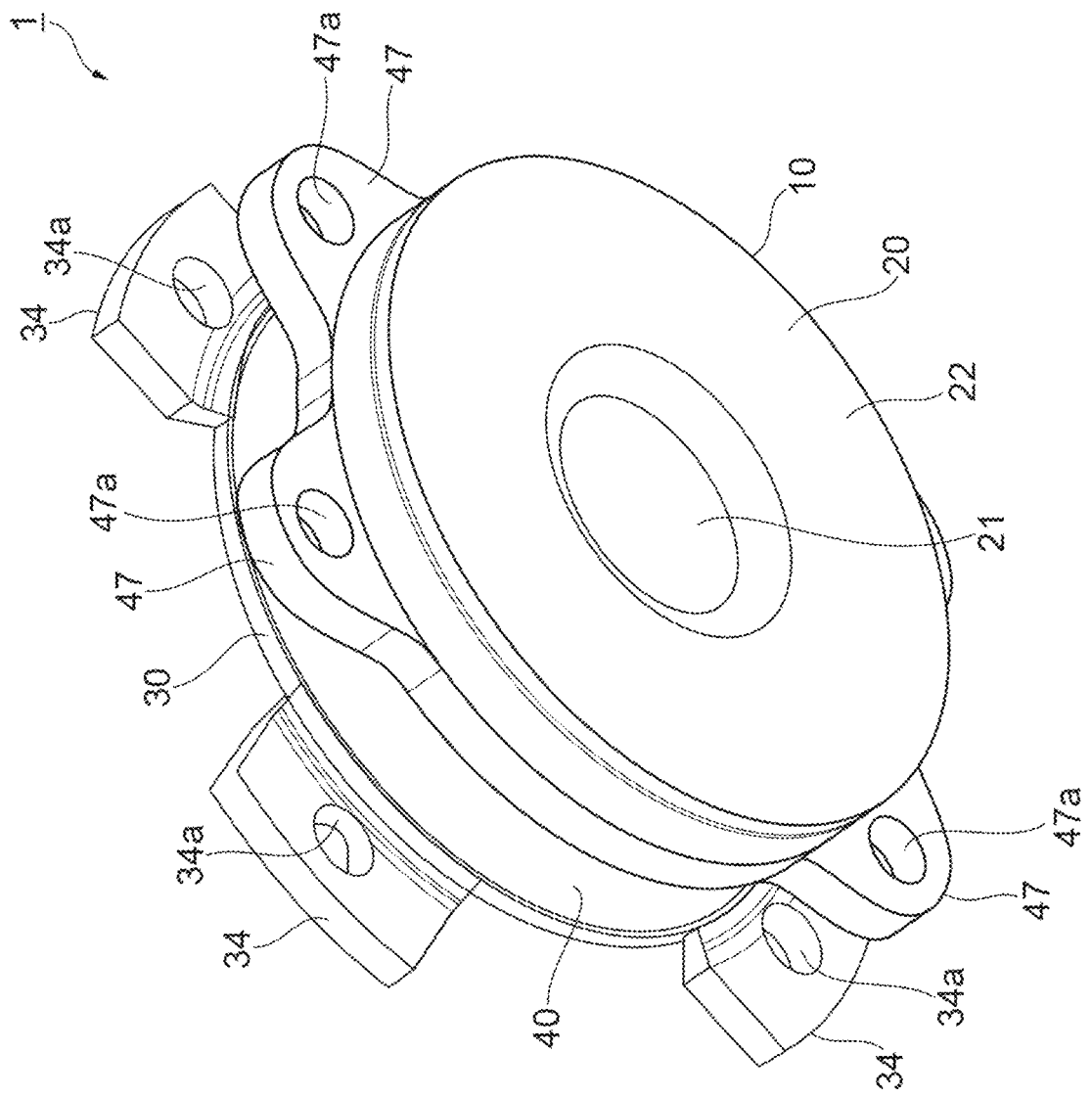
FIG. 3 is a perspective view of the rolling bearing when viewed from the inside in the axial direction.

As shown in FIG. 2 and the like, the plurality of needle rollers 50 include a plurality of first needle rollers 51, a plurality of second needle rollers 52, and a plurality of third needle rollers 53. Hereinafter, the needle roller 50 and a raceway surface thereof will be described. The needle roller 50 is a roller formed in a needle shape. In the present specification, the needle shape refers to a shape with a length-to-diameter ratio of 3 or more and 10 or less or a diameter of 5 mm or less. The plurality of first needle rollers 51 have the same shape, the plurality of second needle rollers 52 have the same shape, and the plurality of third needle rollers 53 have the same shape. The shape of the first needle rollers 51 and the shape of the second needle rollers 52 may be the same or may be different. Similarly, the shape of the first needle rollers 51 and the shape of the third needle rollers 53 may be the same or may be different. Similarly, the shape of the second needle rollers 52 and the shape of the third needle rollers 53 may be the same or may be different.

The inner ring 10 has a first raceway surface 11, a second raceway surface 12, and a third raceway surface 13 as raceway surfaces on which the first needle rollers 51, the second needle rollers 52, and the third needle rollers 53 roll. The first raceway surface 11 is formed of an outer peripheral surface of the cylindrical portion 21 of the first member 20, and faces an inner peripheral surface of the outer ring 40 in the radial direction. The second raceway surface 12 is formed of an inner surface (surface on the outer side in the axial direction) of the first flange portion 22 of the first member 20. The third raceway surface 13 is formed of an inner surface (surface on the inner side in the axial direction) of the second flange portion 33 of the second member 30. The second raceway surface 12 and the third raceway surface 13 face the outer ring 40 in the axial direction. More specifically, the second raceway surface 12 is located on the inner side in the axial direction with respect to the outer ring 40, and faces an axially inner surface of the outer ring 40. The third raceway surface 13 is located on the outer side in the axial direction with respect to the outer ring 40, and faces an axially outer surface of the outer ring 40. In this example, the first raceway surface 11 is a cylindrical surface, and the second raceway surface 12 and third raceway surface 13 are annular surfaces.

The outer ring 40 has raceway surfaces 41, 42, and 43 at positions corresponding to the first raceway surface 11, the second raceway surface 12, and the third raceway surface 13. The raceway surface 41 is formed of a bottom surface of a recessed portion 40a formed on the inner peripheral surface of the outer ring 40. The raceway surface 42 is formed of a bottom surface of a recessed portion 40b formed on the axially inner surface of the outer ring 40. The raceway surface 43 is formed of a bottom surface of a recessed portion 40c formed on the axially outer surface of the outer ring 40. In this example, the raceway surface 41 is a cylindrical surface, and the raceway surfaces 42 and 43 are annular surfaces.

The plurality of first needle rollers 51 are disposed between the first raceway surface 11 of the inner ring 10 and the raceway surface 41 of the outer ring 40, and roll on the first raceway surface 11 and the raceway surface 41. The plurality of second needle rollers 52 are disposed between the second raceway surface 12 of the inner ring 10 and the raceway surface 42 of the outer ring 40, and roll on the second raceway surface 12 and the raceway surface 42. The plurality of third needle rollers 53 are disposed between the third raceway surface 13 of the inner ring 10 and the raceway surface 43 of the outer ring 40, and roll on the third raceway surface 13 and the raceway surface 43. Although not shown, the plurality of first needle rollers 51 are retained by a retainer to be rotatable at constant intervals between the raceway surfaces. Similarly, the plurality of second needle rollers 52 and the plurality of third needle rollers 53 are retained by separate respective retainers to be rotatable at constant intervals between the respective raceway surfaces.

As shown in FIG. 1, ring-shaped seal portions SL for sealing gaps between the outer ring 40 and the inner ring 10 are provided on the axially inner surface and the axially outer surface of the outer ring 40. One seal portion SL is in contact with the inner surface of the first flange portion 22 of the first member 20, and the other seal portion SL is in contact with the inner surface of the second flange portion 33 of the second member 30. Accordingly, the leakage of a lubricant with which the inside of the rolling bearing 1 is filled and the entry of water or foreign matter from the outside are prevented. The seal portions SL are not shown in the figures other than FIG. 1.

Figure 9:
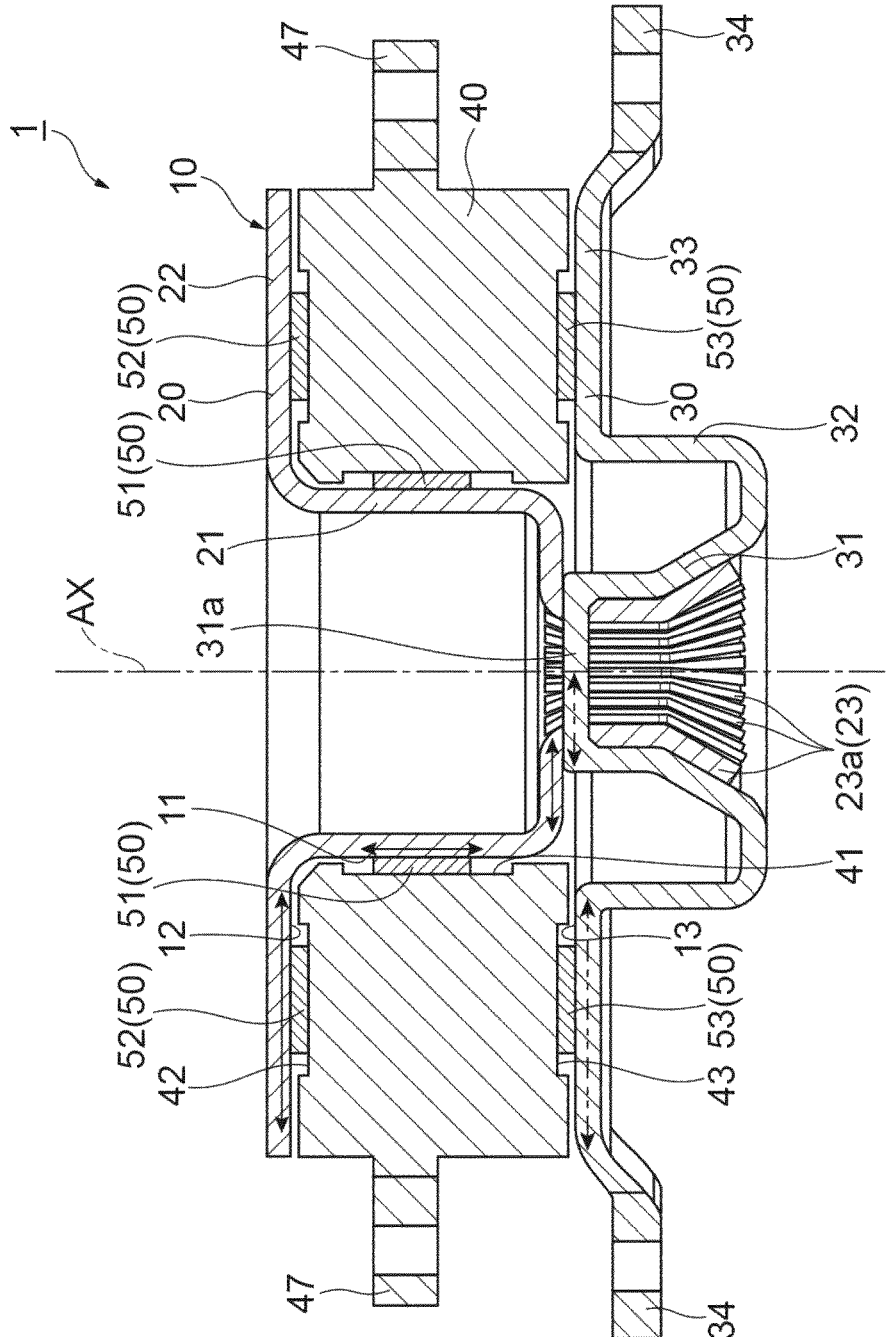
FIG. 9 is a cross-sectional view for describing locations subjected to grinding and/or lapping.

In the embodiment, the first raceway surface 11, the second raceway surface 12, and an abutting surface of the first member 20 against the second member 30 are ground with a grindstone to become ground surfaces. In FIG. 9, locations subjected to the grinding are indicated by solid arrows. In addition, the first raceway surface 11 and the second raceway surface 12 are further subjected to lapping, and the first raceway surface 11 and the second raceway surface 12 become lapped surfaces. The abutting surface of the first member 20 against the second member 30 is a surface of the first member 20 which abuts against the second member 30 when the extending parts 23a of the tightening portion 23 are inserted through the through-holes 31b before the tightening portion 23 is tightened, and in this example, is an axially outer surface of the bottom portion 21a of the cylindrical portion 21 of the first member 20. During grinding, the first raceway surface 11, the second raceway surface 12, and the abutting surface of the first member 20 against the second member 30 are ground using the same grindstone. Thereafter, the first raceway surface 11 and the second raceway surface 12 are subjected to lapping. Accordingly, the difference in height between these surfaces can be reduced. As a result, the difference in dimensions between the surfaces can be reduced, and variations in preload applied to the first needle rollers 51 and the second needle rollers 52 can be suppressed.

In addition, the third raceway surface 13 and an abutting surface of the second member 30 against the first member 20 are ground with a grindstone to become ground surfaces. In FIG. 9, locations subjected to the grinding are indicated by chain double-dashed arrows. In addition, the third raceway surface 13 is further subjected to lapping, and the third raceway surface 13 becomes a lapped surface. The abutting surface of the second member 30 against the first member 20 is a surface of the second member 30 which abuts against the first member 20 when the extending parts 23a of the tightening portion 23 are inserted through the through-holes 31b before the tightening portion 23 is tightened, and in this example, is an axially inner surface of the bottom portion 31a of the first cylindrical portion 31 of the second member 30. During grinding, the third raceway surface 13 and the abutting surface of the second member 30 against the first member 20 are ground using the same grindstone. Thereafter, the third raceway surface 13 is subjected to lapping. Accordingly, the difference in height between these surfaces can be reduced. As a result, the difference in dimensions between the surfaces can be reduced, and variations in preload applied to the third needle rollers 53 can be suppressed. During adjustment of the preload, the preload may be adjusted, for example, by measuring the dimensions of the ground surfaces, measuring the dimensions of the outer ring 40, and combining the first needle rollers 51, the second needle rollers 52, and the third needle rollers 53 classified according to the diameters, based on the measurement results. Incidentally, FIG. 9 shows locations on the left side of the rotation axis AX subjected to grinding and/or lapping; however, similarly, the right side of the rotation axis AX is also subjected to grinding and/or lapping.

Figure 10:
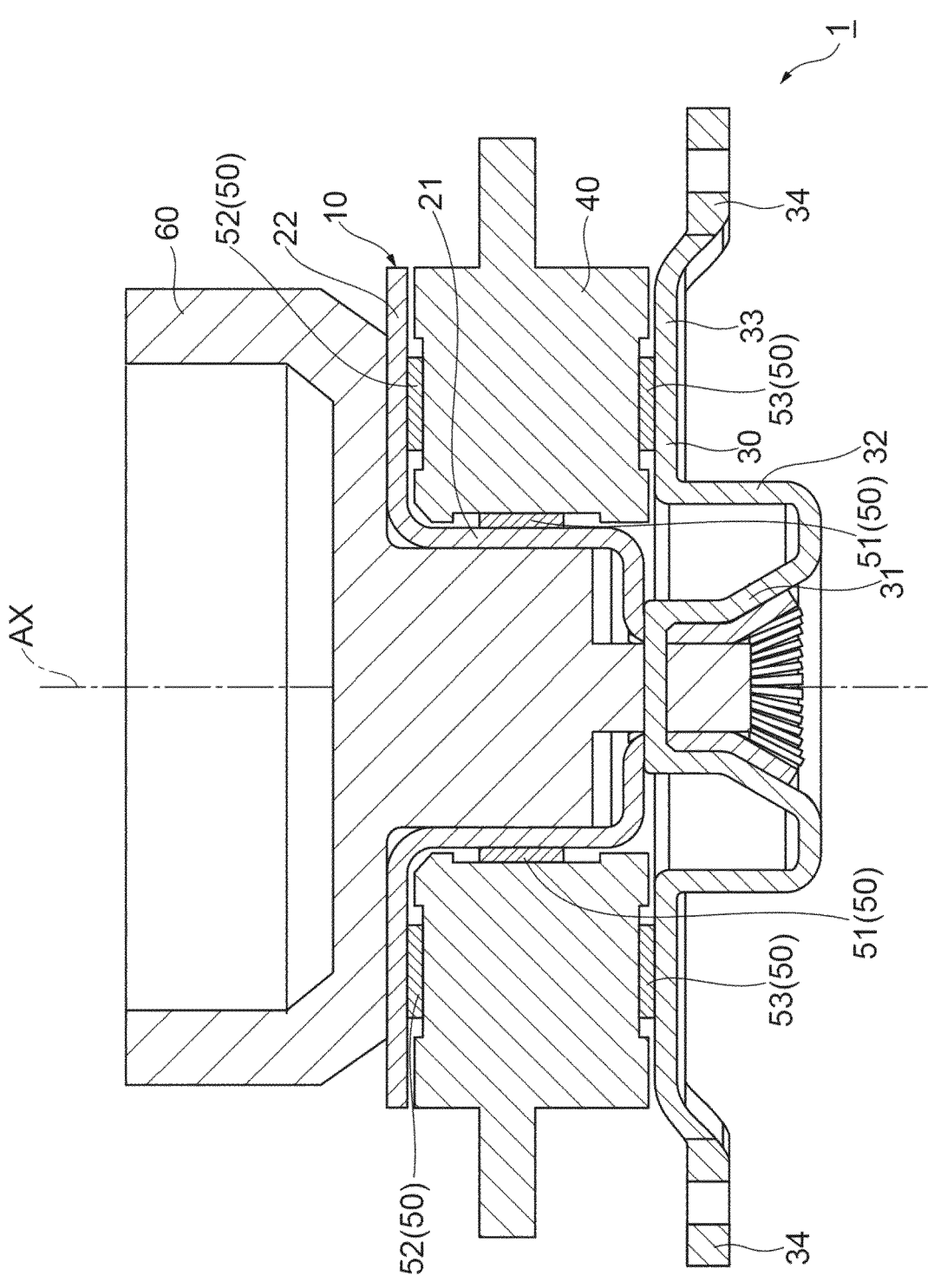
FIG. 10 is a cross-sectional view showing a state where the rolling bearing of the embodiment is connected to a constant velocity joint.

As shown in FIG. 10, when the inner ring 10 is fixed to a drive wheel, a constant velocity joint 60 may be attached to the inner ring 10. Although not shown, splines for engagement between the inner ring 10 and the constant velocity joint 60 are formed on a contact surface of the inner ring 10 with the constant velocity joint 60 and a contact surface of the constant velocity joint 60 with the inner ring 10. The inner ring 10 and the constant velocity joint 60 are engaged with each other by fitting and coupling these splines to each other. In this example, splines are formed on an inner peripheral surface of the cylindrical portion 21 of the first member 20 and an outer surface (surface on the inner side in the axial direction) of the first flange portion 22.

[Functions and Effects]

In the rolling bearing 1, the inner ring 10 includes the first raceway surface 11 facing the outer ring 40 in the radial direction, and the second raceway surface 12 and the third raceway surface 13 facing the outer ring 40 on the inner side and the outer side in the axial direction, respectively. The first needle rollers 51, the second needle rollers 52, and the third needle rollers 53 are disposed between the first raceway surface 11 and the outer ring 40, the second raceway surface 12 and the outer ring 40, and the third raceway surface 13 and the outer ring 40, respectively. Accordingly, a radial load can be taken by the first needle rollers 51, and an axial load can be taken by the second needle rollers 52 and the third needle rollers 53. In addition, since these rolling elements are formed of needle rollers, the space for disposing the rolling elements can be reduced, and downsizing can be achieved. Therefore, according to the rolling bearing 1, downsizing can be achieved. Such a small rolling bearing 1 can be used particularly effectively, for example, in an electric vehicle. The reason is that since reducing the weight is important in an electric vehicle and various structures can be adopted, bearings corresponding to these structures are considered to be required. The first member 20 includes the tightening portion 23, and the first member 20 and the second member 30 are fixed to each other by tightening the tightening portion 23. Accordingly, since the inner ring 10 is formed of the first member 20 and the second member 30 that are fixed to each other by tightening, the manufacture of the inner ring 10 can be facilitated. In addition, the first member 20 and the second member 30 can be firmly coupled by being fixed to each other through tightening.

The tightening parts 23b formed by tightening the tightening portion 23 are exposed to the outside in the axial direction. Accordingly, the tightening parts 23b can be visually recognized from the outside in the axial direction. In this case, there are advantages, for example, it is easy to discover the occurrence of an abnormality in the tightening parts 23b, it is easy to identify the timing of replacement of a member, and it is easy to perform maintenance.

The through-holes 31b are formed in the second member 30, and the first member 20 and the second member 30 are fixed to each other by tightening the tightening portion 23 in a state where the tightening portion 23 is inserted through the through-holes 31b. Accordingly, the first member 20 and the second member 30 can be fixed to each other in a mechanically hooked state, the occurrence of a creep phenomenon where the first member 20 and the second member 30 rotate relative to each other can be suppressed, and the deformation of the inner ring 10 caused by a frictional force between the first member 20 and the second member 30 can be suppressed. Namely, in a conventional configuration using balls or tapered rollers as rolling elements, typically, creep countermeasures are performed using two frictional forces. One countermeasure is to use a frictional force in the axial direction. In order to increase the frictional force in the axial direction, increasing a force (axial force) that clamps the inner ring through tightening is required. The other countermeasure is to use a frictional force in the radial direction. In order to increase the frictional force in the radial direction, increasing a fitting allowance is required. However, when these two frictional forces are increased, a problem such as the inner ring being cracked or expanded of the inner ring due to the deformation of the inner ring may occur. On the other hand, in the rolling bearing 1 of the embodiment, since the inner ring 10 is formed by plate forming, holes of any shape can be formed by pressing. The tightening portion 23 is mechanically hooked to the through-holes 31b by inserting the tightening portion 23 through the through-holes 31b, so that the occurrence of the creep phenomenon can be suppressed. Since increasing the frictional force is not required, the axial force can be small, and the fitting allowance can also be small. For that reason, there is almost no deformation of the inner ring, and it is difficult for the inner ring to expand.

The tightening portion 23 is formed of the plurality of extending parts 23a extending along the axial direction and formed to line up along the circumferential direction. Accordingly, the first member 20 and the second member 30 can be more firmly fixed to each other. In addition, the tightening portion 23 can be made difficult to crack.

The second raceway surface 12 is a lapped surface subjected to lapping, and the abutting surface (axially outer surface of the bottom portion 21a of the cylindrical portion 21) of the first member 20 against the second member 30 is a ground surface subjected to grinding. Accordingly, variations in preload applied to the second needle rollers 52 can be suppressed.

The third raceway surface 13 is a lapped surface subjected to lapping, and the abutting surface (axially inner surface of the bottom portion 31a of the first cylindrical portion 31) of the second member 30 against the first member 20 is a ground surface subjected to grinding. Accordingly, variations in preload applied to the third needle rollers 53 can be suppressed.

The inner ring 10 is made of only a plate-shaped member. Accordingly, the degree of freedom in designing the inner ring 10 can be increased, and the inner ring 10 can be downsized and reduced in weight. In addition, for example, when the inner ring is formed by hot forging, there are problems such as the press load being high, equipment being large, and the amount of carbon dioxide emissions being large, whereas according to the rolling bearing 1 of the embodiment, since the press load is low, the equipment can be made small, and the amount of carbon dioxide emissions is small due to cold forming, the above-described problems can be solved.

The inner ring 10 includes the fixing portions 34 in which the insertion holes 34a through which fixing members are inserted are formed, and the thickness of the fixing portions 34 is thicker than the thicknesses of parts of the inner ring 10 other than the fixing portions 34. Accordingly, the strength of the fixing portions 34 can be increased.

Splines for engagement with the constant velocity joint 60 (joint unit of the drive shaft) are formed on the inner ring 10. Accordingly, the constant velocity joint 60 can be engaged with the inner ring 10.

The first member 20 includes the first flange portion 22 formed in an annular plate shape, and facing the outer ring 40 on the inner side in the axial direction, and the first flange portion 22 has the second raceway surface 12. The second member 30 includes the second flange portion 33 formed in an annular plate shape, and facing the outer ring 40 on the outer side in the axial direction, and the second flange portion 33 has the third raceway surface 13. Accordingly, the degree of freedom in designing the inner ring 10 can be increased, it is possible to cope with a case where bending moment requirements are strict, and the inner ring 10 can be downsized and reduced in weight.

MODIFICATION EXAMPLES

FIGS. 11 to 17 show a rolling bearing 1A of a first modification example. In the first modification example, the first member 20 includes the cylindrical portion 21 and the first flange portion 22, and does not include the tightening portion 23. A plurality of through-holes 21b through which a tightening portion 35 to be described later is inserted are formed in the bottom portion 21a of the cylindrical portion 21. The plurality of through-holes 21b penetrate through the bottom portion 21a along the axial direction, and are disposed in line at equal intervals along the circumferential direction.

In the first modification example, the first cylindrical portion 31 of the second member 30 does not include the bottom portion 31a, but includes the tightening portion 35. The tightening portion 35 extends from an axially inner edge of the first cylindrical portion 31 to the inside in the axial direction. The tightening portion 35 is formed of a plurality of extending parts 35a extending along the axial direction and formed to line up along the circumferential direction. Each extending part 35a is formed, for example, in a long plate shape (rod shape having a rectangular cross section).

Figure 14:
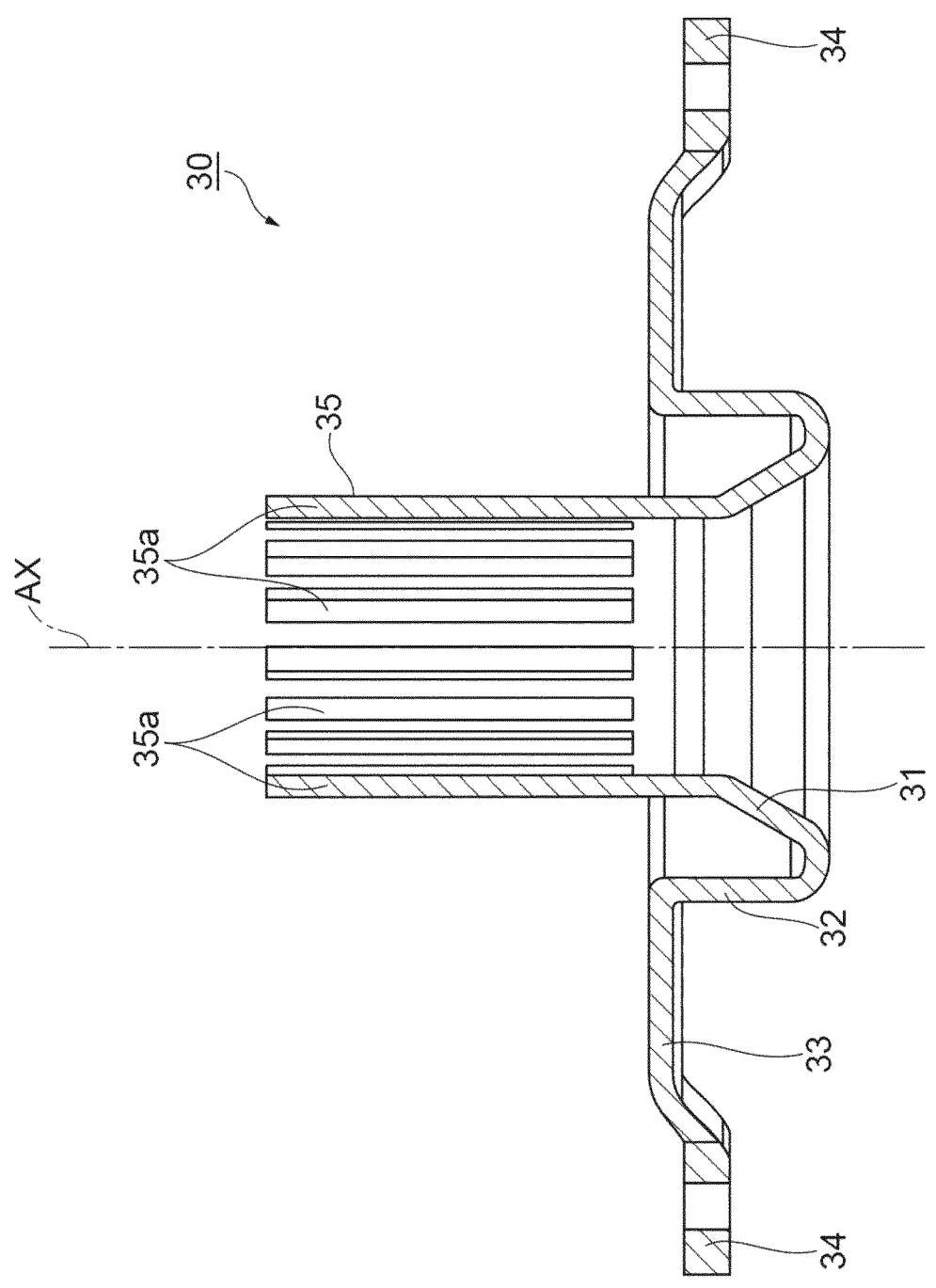
FIG. 14 is a cross-sectional view of a second member of the first modification example.

In the first modification example, the first member 20 and the second member 30 are fixed to each other by tightening each extending part 35a in a state where the plurality of extending parts 35a of the tightening portion 35 are inserted through the plurality of respective through-holes 21b. A direction in which the tightening portion 35 is inserted through the through-holes 21b in the first modification example is opposite to a direction in which the tightening portion 23 is inserted through the through-holes 31b in the embodiment. FIG. 14 shows the tightening portion 23 before tightening, and FIG. 11 shows the state after tightening.

Figure 11:
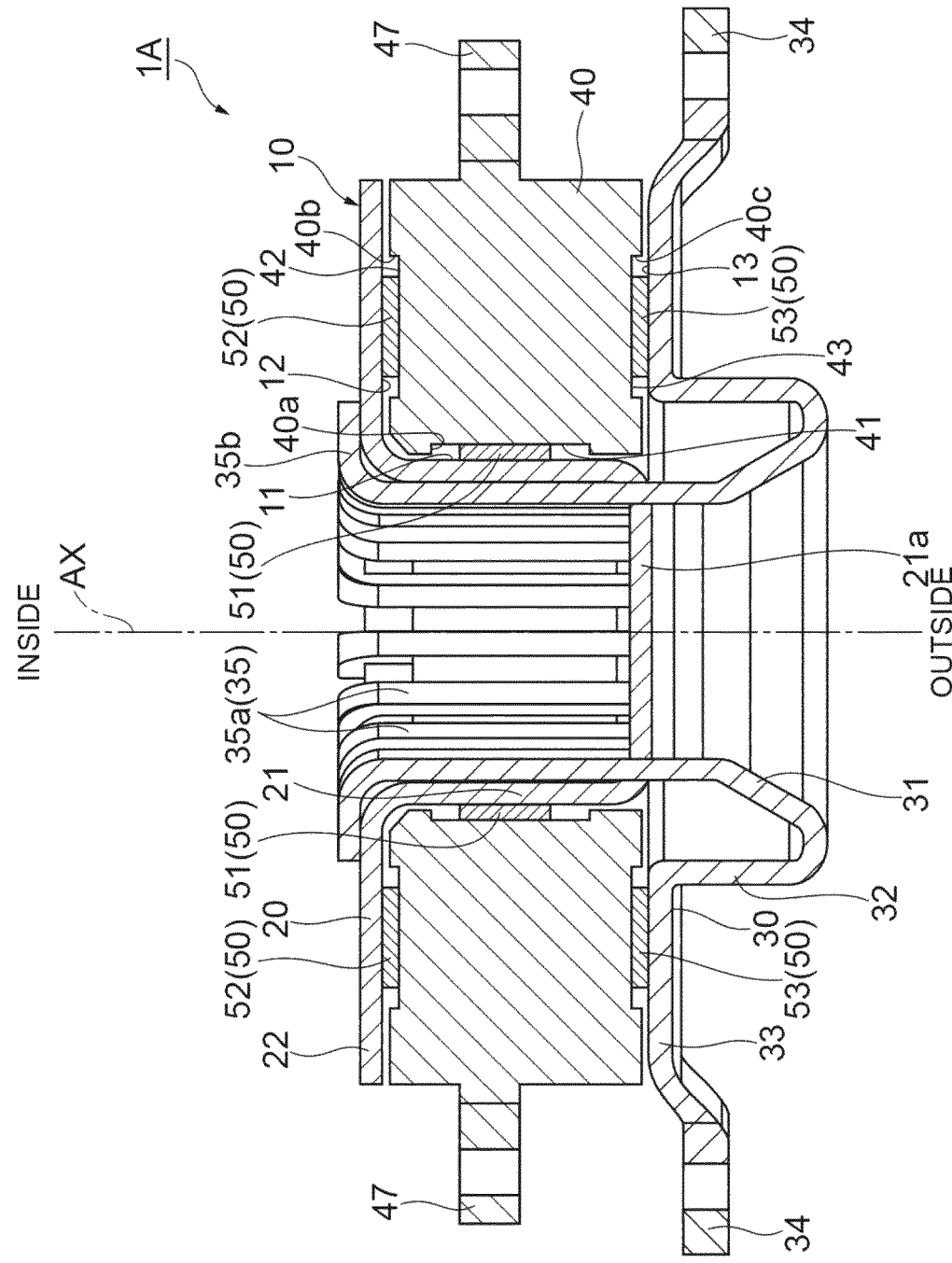
FIG. 11 is a cross-sectional view of a rolling bearing of a first modification example.
Figure 12:
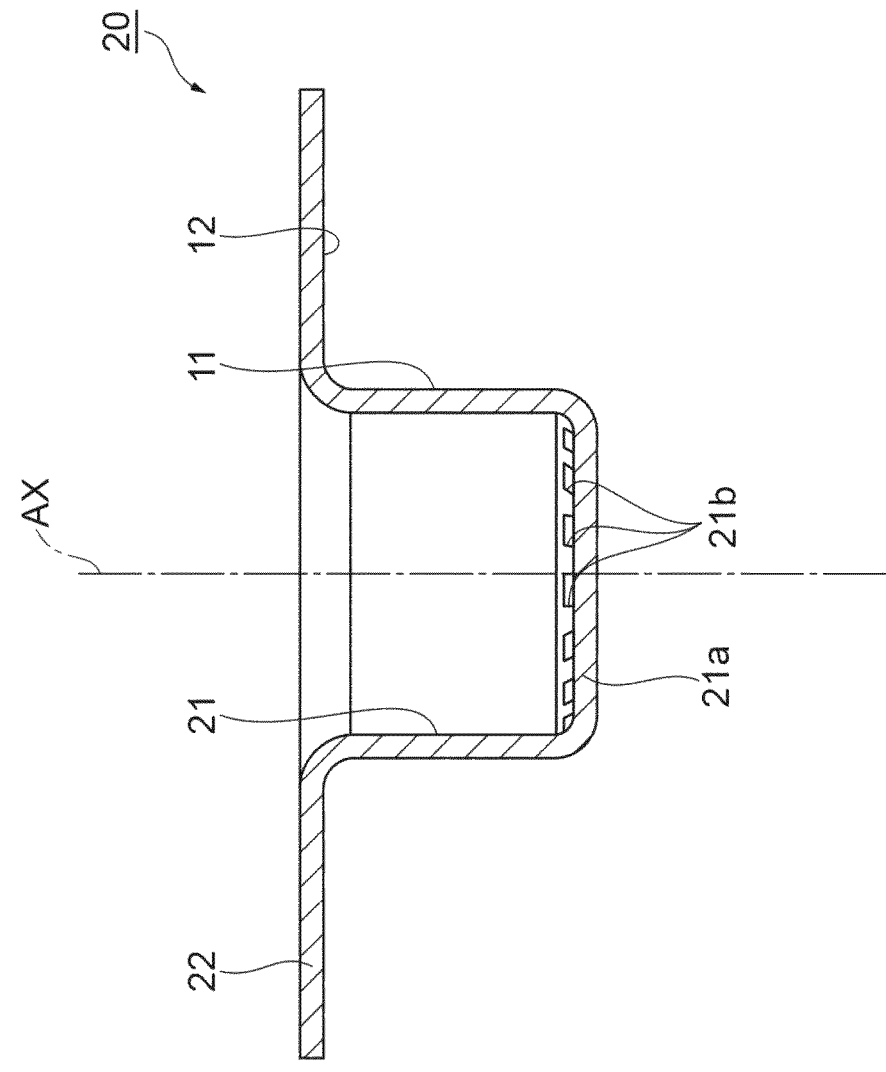
FIG. 12 is a cross-sectional view of a first member of the first modification example.
Figure 13:
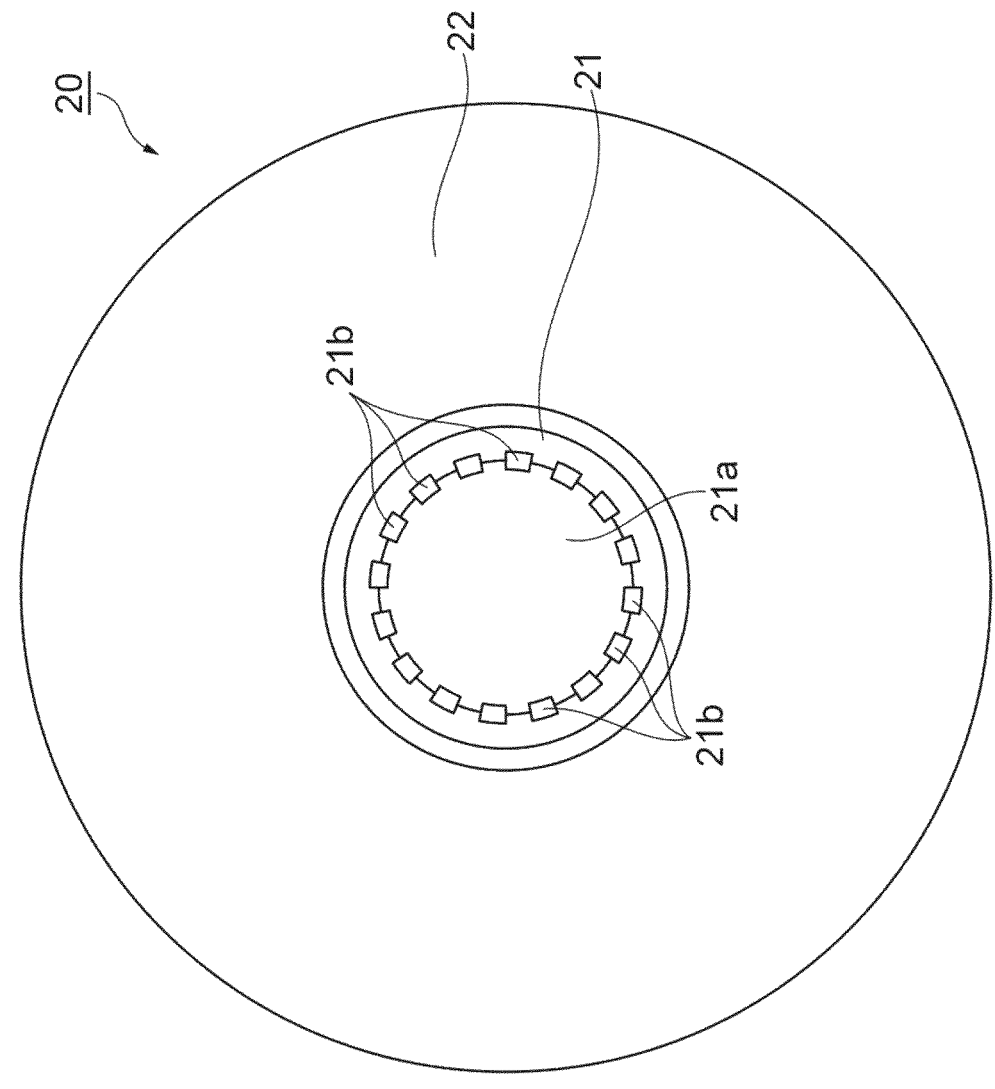
FIG. 13 is a plan view of the first member of the first modification example.

As shown in FIG. 11, through a tightening process, the extending parts 35a are bent at intermediate portions thereof, and are deformed such that tip side parts of the extending parts 35a are aligned with the outer surface (surface on the inner side in the axial direction) of the first flange portion 22 of the cylindrical portion 21 of the first member 20. Tightening parts 35b (tip side parts of the extending parts 35a) formed by tightening the tightening portion 35 are exposed to the inside in the axial direction. In this case, for example, an ABS sensor can be attached by using the fact that the tightening portion 35 is divided at equal intervals.

Figure 15:
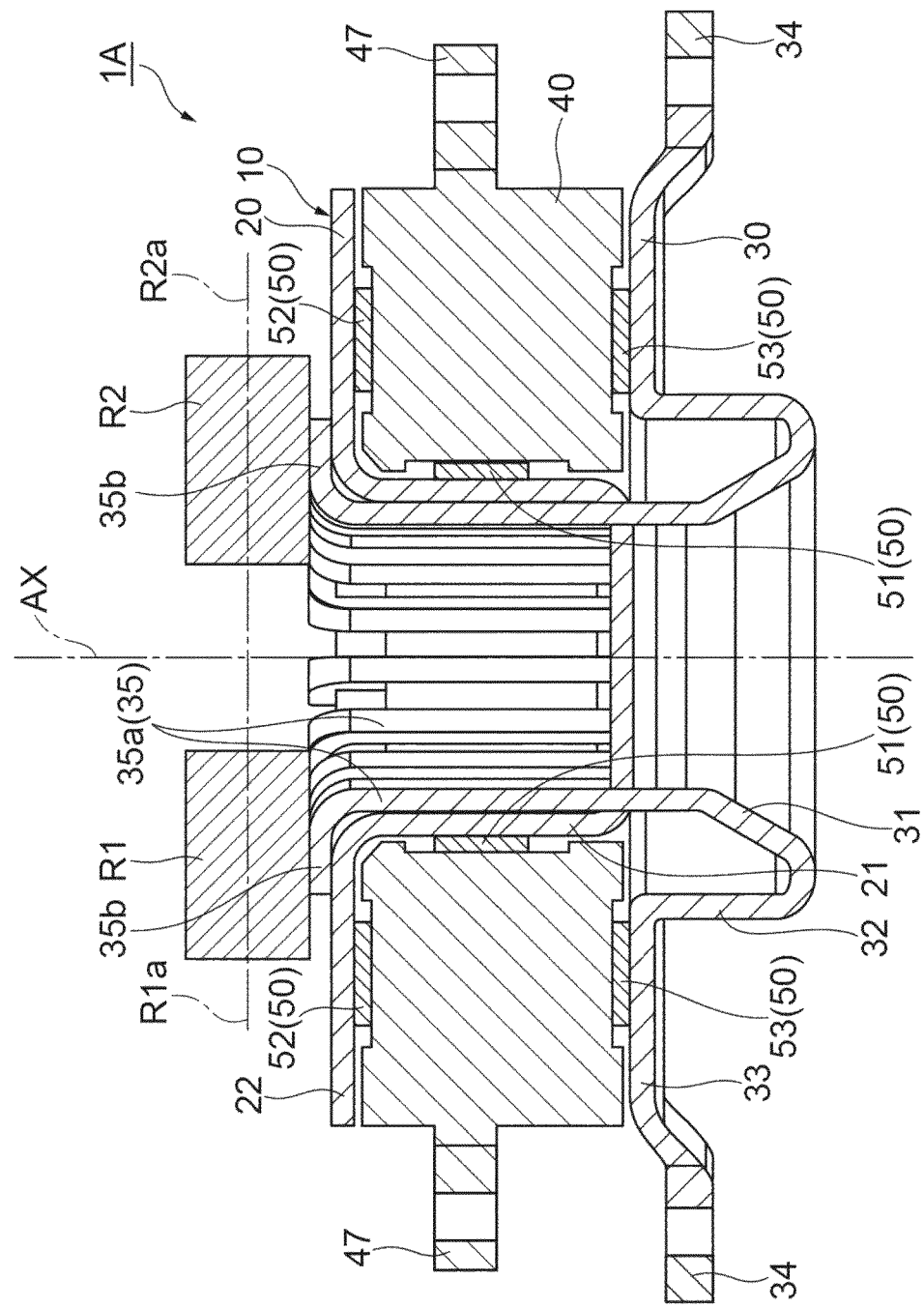
FIG. 15 is a cross-sectional view for describing a tightening process of the first modification example.

As shown in FIG. 15, in the tightening process, the tip side part of the tightening portion 35 is tightened by rollers R1 and R2. For example, in this example, the tightening portion 35 is tightened by the rollers R1 and R2 of which center lines R1a and R2a are disposed parallel to the radial direction. The rollers R1 and R2 are symmetrically disposed at an equal interval along the radial direction. Accordingly, a load can be evenly applied to the tightening portion 35. The reason for applying the load evenly is to prevent deformation of the inner ring 10 caused by an uneven load during tightening.

Figure 16:
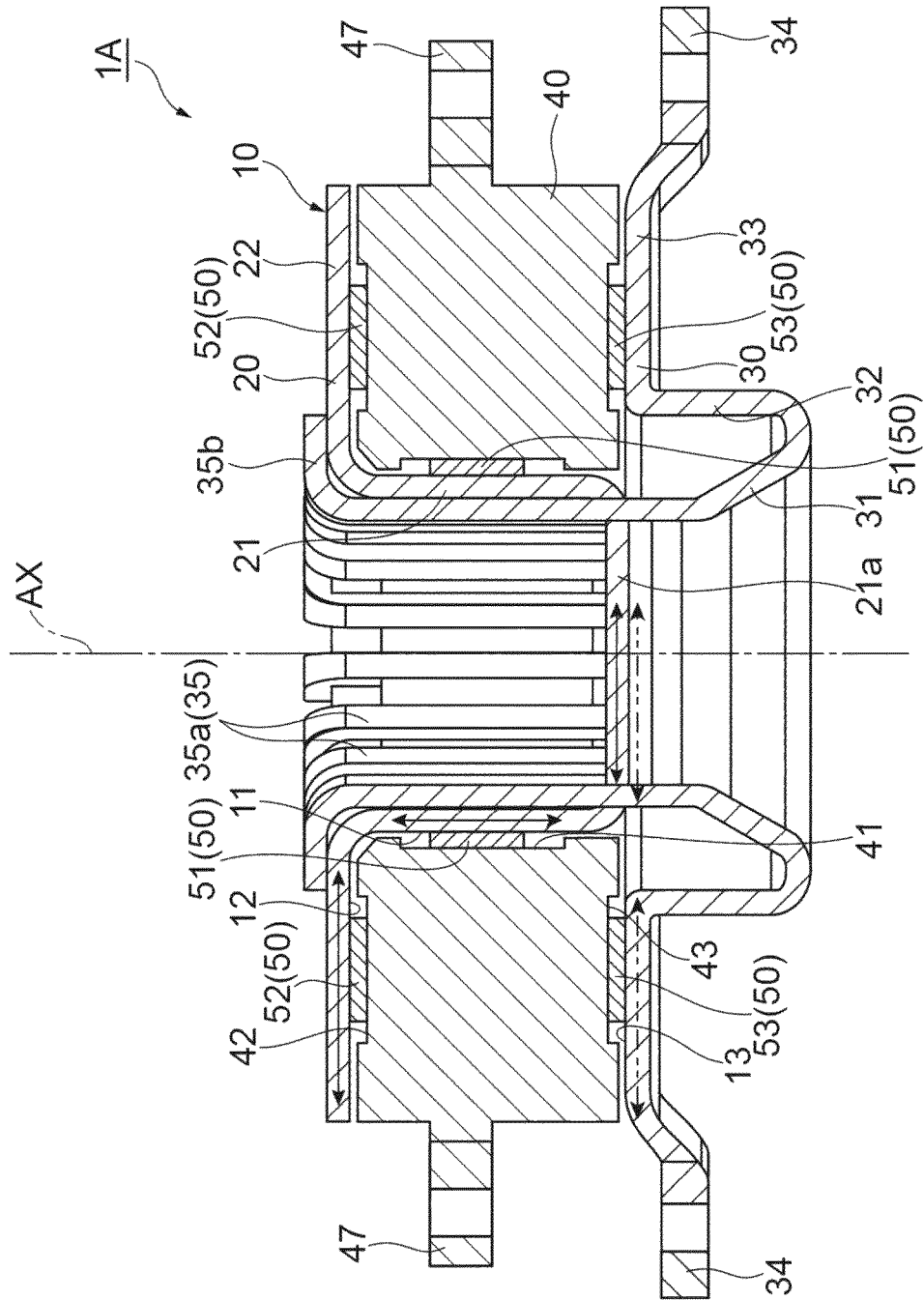
FIG. 16 is a cross-sectional view for describing ground locations in the first modification example.

In the first modification example, the first raceway surface 11, the second raceway surface 12, and the abutting surface of the first member 20 against the second member 30 are ground with a grindstone to become ground surfaces. In FIG. 16, locations subjected to the grinding are indicated by solid arrows. In addition, the first raceway surface 11 and the second raceway surface 12 are further subjected to lapping, and the first raceway surface 11 and the second raceway surface 12 become lapped surfaces. The abutting surface of the first member 20 against the second member 30 is a surface of the first member 20 which abuts against the second member 30 when the extending parts 35a of the tightening portion 35 are inserted through the through-holes 21b before the tightening portion 35 is tightened, and in this example, is the axially outer surface of the bottom portion 21a of the cylindrical portion 21 of the first member 20.

In addition, the third raceway surface 13 and the abutting surface of the second member 30 against the first member 20 are ground with a grindstone to become ground surfaces. In FIG. 16, locations subjected to the grinding are indicated by chain double-dashed arrows. In addition, the third raceway surface 13 is further subjected to lapping, and the third raceway surface 13 becomes a lapped surface. The abutting surface of the second member 30 against the first member 20 is a surface of the second member 30 which abuts against the first member 20 when the extending parts 35a of the tightening portion 35 are inserted through the through-holes 21b before the tightening portion 35 is tightened, and in this example, is a stepped surface (not shown) formed on the first cylindrical portion 31 of the second member 30. Incidentally, FIG. 16 shows locations on the left side of the rotation axis AX subjected to grinding and/or lapping; however, similarly, the right side of the rotation axis AX is also subjected to grinding and/or lapping.

Figure 17:
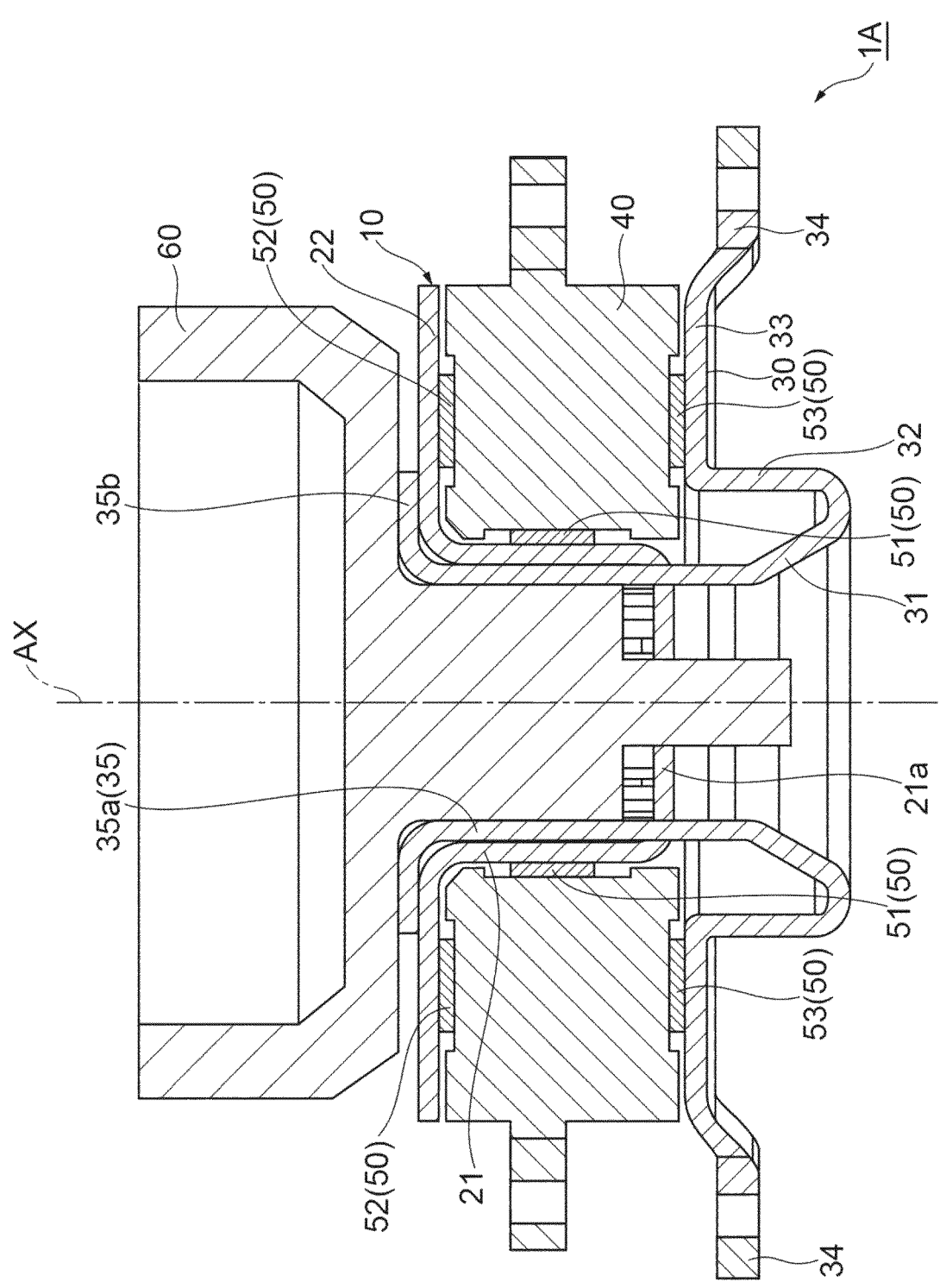
FIG. 17 is a cross-sectional view showing a state where the rolling bearing of the first modification example is connected to a constant velocity joint.

As shown in FIG. 17, in the first modification example as well, the constant velocity joint 60 may be attached to the inner ring 10. In this example, splines are formed on a surface of the tightening portion 35 (the tightening parts 35b and parts of the extending parts 35a other than the tightening parts 35b) of the second member 30. The splines formed on the surfaces of the tightening parts 35b are face splines using the fact that the tightening portion 35 is divided at equal intervals.

With the rolling bearing 1A of the first modification example as well, similarly to the embodiment, downsizing can be achieved. In addition, the second member 30 includes the tightening portion 35, and the tightening parts 35b formed by tightening the tightening portion 35 are exposed to the inside in the axial direction. Accordingly, the design of the rolling bearing 1 can be facilitated.

Figure 18:
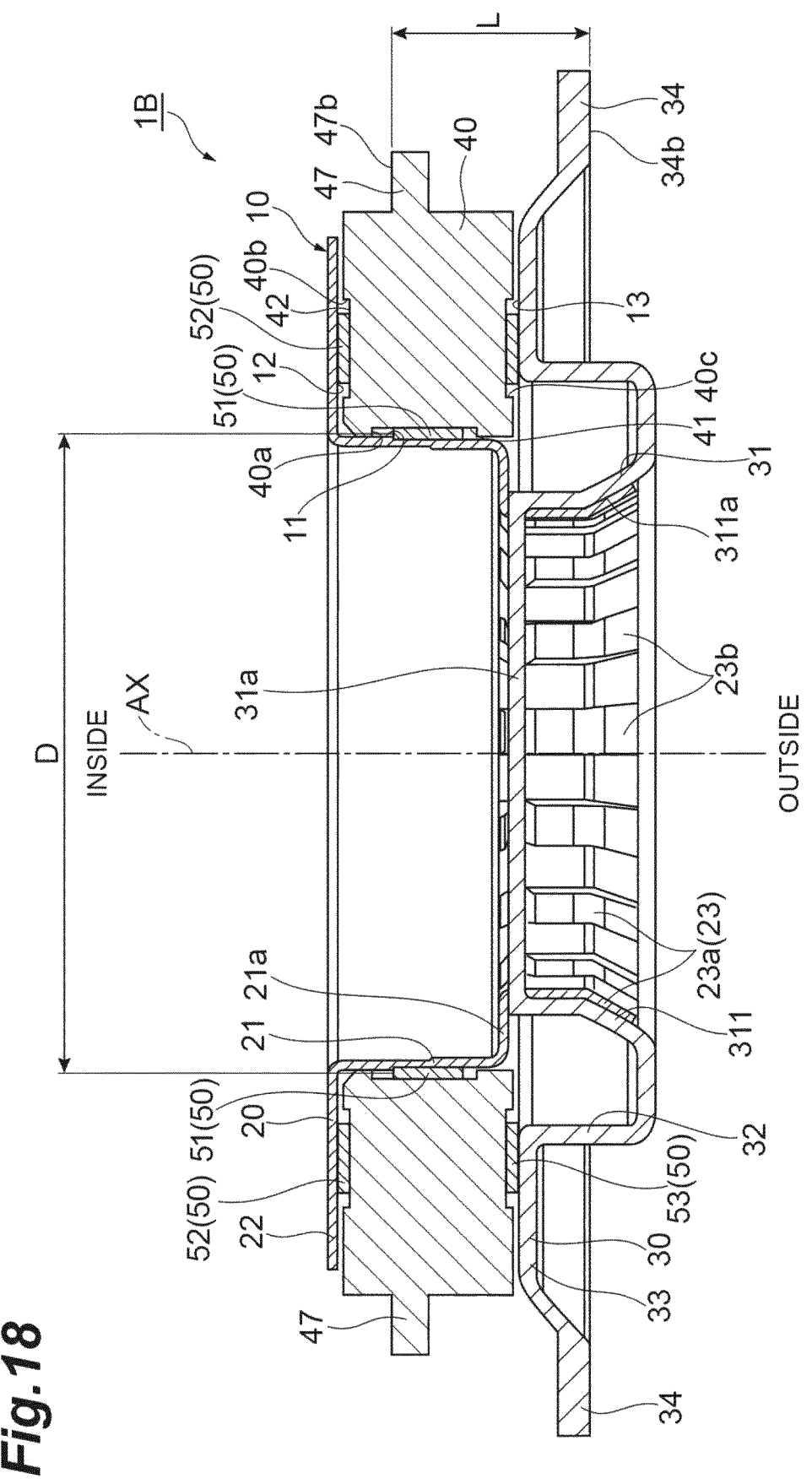
FIG. 18 is a cross-sectional view of a rolling bearing of a second modification example.
Figure 19:
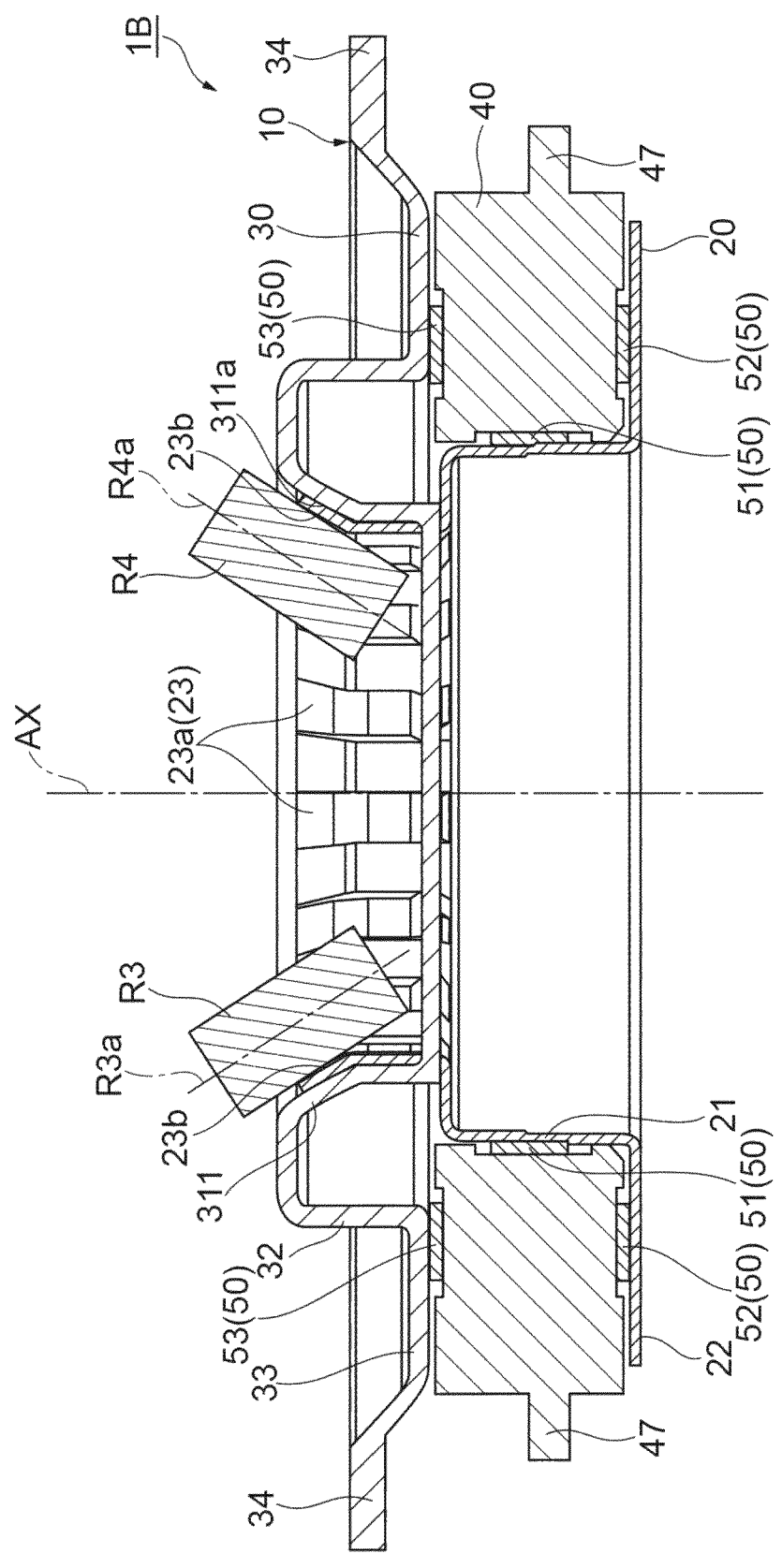
FIG. 19 is a cross-sectional view for describing a tightening process of the second modification example.

FIGS. 18 and 19 show a rolling bearing 1B of a second modification example. In the second modification example, the inner diameters of the inner ring 10 and the outer ring 40 are larger than those of the embodiment. When a distance between a surface 34b of the fixing portion 34 of the inner ring 10 and a surface 47b of the fixing portion 47 of the outer ring 40 in the axial direction is L, and a distance between center lines of the first needle rollers 51 in the radial direction is D, D/L is 2 or more. The surface 34b is an axially outer surface of the fixing portion 34, and the surface 47b is an axially inner surface of the fixing portion 47. The distance D is a distance between the center lines of a pair of the first needle rollers 51 facing each other in the radial direction.

With the rolling bearing 1B of the second modification example as well, similarly to the embodiment, downsizing can be achieved. In addition, since D/I, is 2 or more, the diameter of the rolling bearing 1B can be increased. In such a manner, since the inner ring 10 is formed by plate forming, the diameter of the inner ring 10 can be increased. Namely, in the conventional configuration using balls or tapered rollers as rolling elements, in many cases, forming is performed by hot forging using large equipment capable of applying a load of several thousand tons. Therefore, it is difficult to manufacture a wheel support rolling bearing with a large diameter due to a limit to equipment. On the other hand, according to the rolling bearing 1B of the second modification example, since the inner ring 10 is formed by plate forming, only processes such as bending and drawing are performed, and a large load is not required as in the case of forging. For that reason, the diameter of the wheel support rolling bearing can be increased. Such a configuration is particularly effective, for example, when a gear or the like is incorporated into a bearing, such as in an in-wheel motor.

As shown in FIG. 19, in the tightening process of the second modification example, the tip side part of the tightening portion 35 is tightened by rollers R3 and R4. For example, in this example, the tightening portion 35 is tightened by spin-tightening using the rollers R3 and R4 of which center lines R3a and R4a are inclined with respect to the axial direction. Since the tightening load is made very small by forming the inner ring 10 through plate forming, the amount of carbon dioxide emissions is small, and tightening can be performed using very small and inexpensive equipment.

Figure 20:
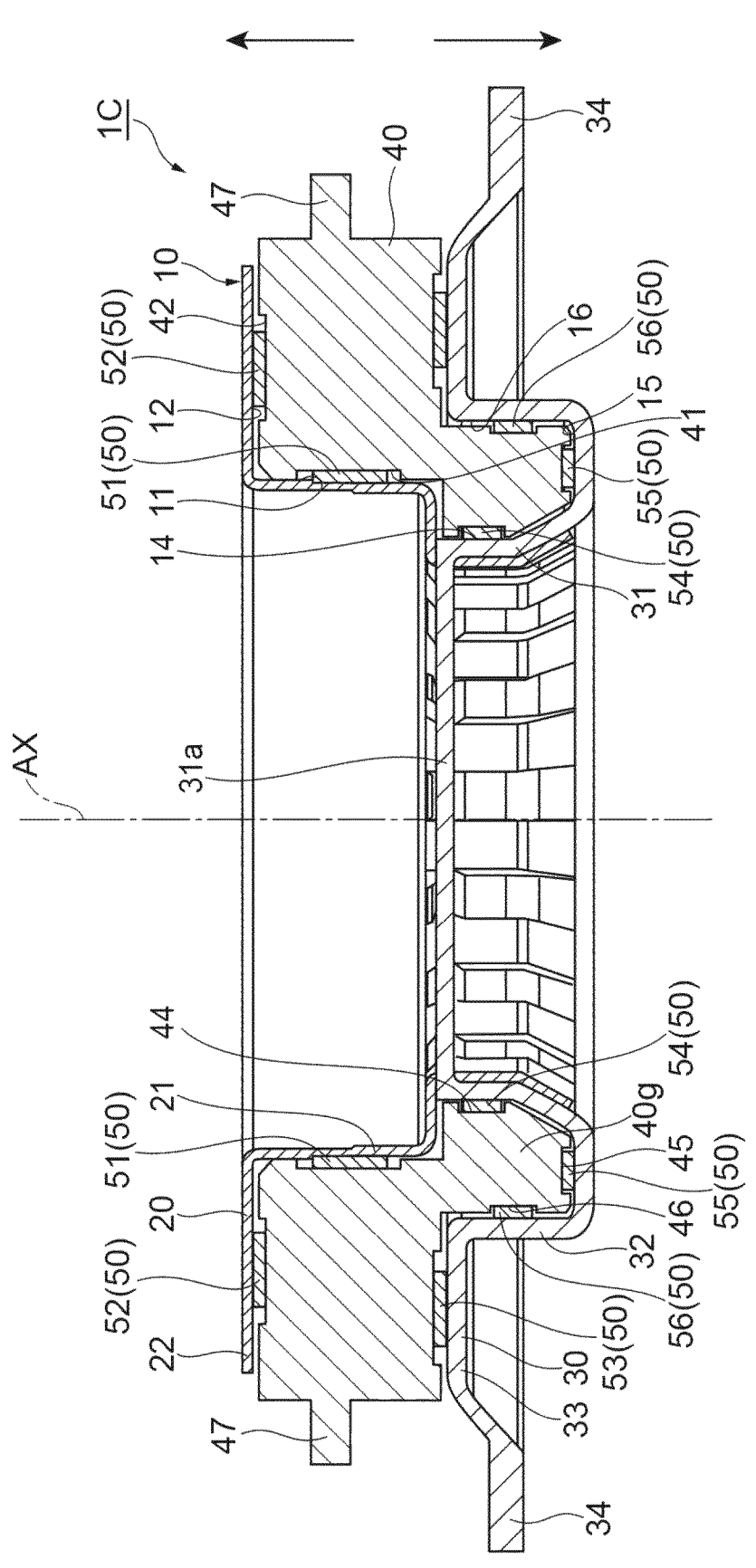
FIG. 20 is a cross-sectional view of a rolling bearing of a third modification example.

FIG. 20 shows a rolling bearing 1C of a third modification example. The third modification example is different from the second modification example in that the plurality of needle rollers 50 further include a plurality of fourth needle rollers 54, a plurality of fifth needle rollers 55, and a plurality of sixth needle rollers 56. In the third modification example, the outer ring 40 includes a part 40g located outside the second cylindrical portion 32 of the second member 30, and raceway surfaces 44, 45, and 46 are formed on the part 40g. The raceway surface 44 is formed of a bottom surface of a recessed portion formed on a radially inner surface of the part 40g. The raceway surface 45 is formed of a bottom surface of a recessed portion formed on an axially outer surface of the part 40g. The raceway surface 46 is formed of a bottom surface of a recessed portion formed on a radially outer surface of the part 40g.

The inner ring 10 further includes a fourth raceway surface 14, a fifth raceway surface 15, and a sixth raceway surface 16. The fourth raceway surface 14 is formed of an outer peripheral surface of the first cylindrical portion 31 of the second member 30, and faces the raceway surface 44 in the radial direction. The fifth raceway surface 15 is formed of an inner surface (surface on the inner side in the axial direction) of a connecting part between the first cylindrical portion 31 and the second cylindrical portion 32 in the second member 30, and faces the raceway surface 45 in the axial direction. The sixth raceway surface 16 is formed of an inner peripheral surface of the second cylindrical portion 32 of the second member 30, and faces the raceway surface 46 in the radial direction.

The plurality of fourth needle rollers 54 are disposed between the fourth raceway surface 14 of the inner ring 10 and the raceway surface 44 of the outer ring 40, and roll on the fourth raceway surface 14 and the raceway surface 44. The plurality of fifth needle rollers 55 are disposed between the fifth raceway surface 15 of the inner ring 10 and the raceway surface 45 of the outer ring 40, and roll on the fifth raceway surface 15 and the raceway surface 45. The plurality of sixth needle rollers 56 are disposed between the sixth raceway surface 16 of the inner ring 10 and the raceway surface 46 of the outer ring 40, and roll on the sixth raceway surface 16 and the raceway surface 46.

With the rolling bearing 1C of the third modification example as well, similarly to the embodiment, downsizing can be achieved. In addition, the plurality of needle rollers 50 include the plurality of fourth needle rollers 54 disposed between the fourth raceway surface 14 and the outer ring 40. Accordingly, it is possible to increase the load that can be taken by the rolling bearing 1C, while suppressing an increase in the size of the rolling bearing 1C. In addition, for example, compared to the second modification example, the number of rolling elements can be increased with almost no change in size, and strength that meets requirements can be designed. For example, even when a force (bending moment) that expands the fixing portions 34 and 47 (flanges) is applied as indicated by arrows in FIG. 20, the force can be taken by the fourth needle rollers 54, the fifth needle rollers 55, and the sixth needle rollers 56, so that the strength can be increased.

The present disclosure is not limited to the embodiment and the modification examples. For example, the material and shape of each configuration are not limited to the material and shape described above, and various materials and shapes can be adopted. The inner ring 10 may be formed of only one member. The inner ring 10 (the first member 20) and the second member 30) may be made of a member other than a plate-shaped member. A part of the inner ring 10 may be made of a member other than a plate-shaped member, or the entirety of the inner ring 10 may be made of a member other than a plate-shaped member.

The first member 20 and the second member 30 may be fixed to each other by a fixing method other than tightening. The tightening portion 23 may not include the plurality of extending part 23a, and may be formed of, for example, one tightening piece. In the embodiment, the tightening is performed in a state where the tightening portion 23 is inserted through the through-holes 31b; however, the first member 20 and the second member 30 may be fixed to each other by tightening the tightening portion 23 that is not inserted through the through-holes, without inserting the tightening portion 23 through the through-holes. The first raceway surface 11, the second raceway surface 12, and the abutting surface of the first member 20 against the second member 30 may not be ground surfaces. Similarly, the third raceway surface 13 and the abutting surface of the second member 30 against the first member 20 may not be ground surfaces. The thickness of the fixing portions 34 may be equal to the thicknesses of the parts of the inner ring 10 other than the fixing portions 34.

REFERENCE SIGNS LIST 1, 1A, 1B, 1C: rolling bearing (wheel support rolling bearing), 10: inner ring, 11: first raceway surface, 12: second raceway surface, 13: third raceway surface, 14: fourth raceway surface, 20: first member, 21b: through-hole, 22: first flange portion, 23: tightening portion, 23a: extending part, 23b: tightening part, 30: second member, 31b: through-hole, 33: second flange portion, 34: fixing portion (first fixing portion), 34a: insertion hole, 34b: surface, 35: tightening portion, 35a: extending part, 35b: tightening part, 40: outer ring, 47: fixing portion (second fixing portion), 47b:

surface, 50: needle roller, 51: first needle roller, 52: second needle roller, 53: third needle roller, 54: fourth needle roller.

The invention claimed is:

1. A wheel support rolling bearing for rotatably supporting a wheel with respect to a vehicle body, the bearing comprising:
  an inner ring to be fixed to the wheel;
  an outer ring to be fixed to the vehicle body; and
  a plurality of needle rollers rollably disposed between the inner ring and the outer ring,
  wherein the inner ring includes a first raceway surface facing the outer ring in a radial direction, and a second raceway surface and a third raceway surface facing the outer ring in an axial direction, the second raceway surface is located on an inner side in the axial direction with respect to the outer ring, and the third raceway surface is located on an outer side in the axial direction with respect to the outer ring, and
  the plurality of needle rollers include a plurality of first needle rollers disposed between the first raceway surface and the outer ring, a plurality of second needle rollers disposed between the second raceway surface and the outer ring, and a plurality of third needle rollers disposed between the third raceway surface and the outer ring.

2. The wheel support rolling bearing according to claim 1, wherein the inner ring includes a first member including the second raceway surface, and a second member including the third raceway surface,
  one of the first member and the second member includes a tightening portion, and
  the first member and the second member are fixed to each other by tightening the tightening portion.

3. The wheel support rolling bearing according to claim 2, wherein the first member includes the tightening portion, and
  a tightening part formed by tightening the tightening portion is exposed to an outside in the axial direction.

4. The wheel support rolling bearing according to claim 2, wherein the second member includes the tightening portion, and
  a tightening part formed by tightening the tightening portion is exposed to an inside in the axial direction.

5. The wheel support rolling bearing according to claim 2, wherein a through-hole is formed in the other of the first member and the second member, and
  the first member and the second member are fixed to each other by tightening the tightening portion in a state where the tightening portion is inserted through the through-hole.

6. The wheel support rolling bearing according to claim 2, wherein the tightening portion is formed of a plurality of parts extending along the axial direction and formed to line up along a circumferential direction.

7. The wheel support rolling bearing according to claim 2, wherein the second raceway surface and an abutting surface of the first member against the second member are ground surfaces subjected to grinding or lapped surfaces subjected to lapping.

8. The wheel support rolling bearing according to claim 2, wherein the third raceway surface and an abutting surface of the second member against the first member are ground surfaces subjected to grinding or lapped surfaces subjected to lapping.

9. The wheel support rolling bearing according to claim 2, wherein the first member includes a first flange portion formed in an annular plate shape, and facing the outer ring on the inner side in the axial direction, and the first flange portion includes the second raceway surface, and
  the second member includes a second flange portion formed in an annular plate shape, and facing the outer ring on the outer side in the axial direction, and the second flange portion includes the third raceway surface.

10. The wheel support rolling bearing according to claim 1, wherein the inner ring is made of a plate-shaped member.

11. The wheel support rolling bearing according to claim 10, wherein the inner ring includes a fixing portion in which an insertion hole through which a fixing member is to be inserted is formed, and
  a thickness of the fixing portion is thicker than thicknesses of parts of the inner ring other than the fixing portion.

12. The wheel support rolling bearing according to claim 1, wherein a spline for an engagement with a joint unit of a drive shaft is formed on the inner ring.

13. The wheel support rolling bearing according to claim 1, wherein the inner ring further includes a fourth raceway surface spaced apart from the first raceway surface, the second raceway surface, and the third raceway surface, and
  the plurality of needle rollers further include a plurality of fourth needle rollers disposed between the fourth raceway surface and the outer ring.

14. The wheel support rolling bearing according to claim 1, wherein the inner ring includes a first fixing portion to be fixed to the wheel,
  the outer ring includes a second fixing portion to be fixed to the vehicle body, and
  when a distance between an axially outer surface of the first fixing portion and an axially inner surface of the second fixing portion in the axial direction is L, and a distance between center lines of the first needle rollers in the radial direction is D, D/L is 2 or more.

* * * * *